US011177971B2

(12) United States Patent
Pinheiro et al.

(10) Patent No.: US 11,177,971 B2
(45) Date of Patent: Nov. 16, 2021

(54) DEVICE-TO-DEVICE DISCOVERY FOR COOPERATIVE OPERATION

(71) Applicant: Intel Corporation, Santa Clara, CA (US)

(72) Inventors: Ana Lucia A. Pinheiro, Hillsboro, OR (US); Ranganadh Karella, San Diego, CA (US); Meghashree Dattatri Kedalagudde, Portland, OR (US); Dave Cavalcanti, Portland, OR (US)

(73) Assignee: Intel Corporation, Santa Clara, CA (US)

(*) Notice: Subject to any disclaimer, the term of this patent is extended or adjusted under 35 U.S.C. 154(b) by 59 days.

(21) Appl. No.: 16/489,840

(22) PCT Filed: Mar. 30, 2017

(86) PCT No.: PCT/US2017/024946
§ 371 (c)(1),
(2) Date: Aug. 29, 2019

(87) PCT Pub. No.: WO2018/182603
PCT Pub. Date: Oct. 4, 2018

(65) Prior Publication Data
US 2020/0021451 A1    Jan. 16, 2020

(51) Int. Cl.
*H04L 12/18*    (2006.01)
*H04W 4/70*     (2018.01)
*H04W 76/14*    (2018.01)
*H04W 76/45*    (2018.01)
*H04W 4/40*     (2018.01)
*H04L 29/08*    (2006.01)
*H04W 4/02*     (2018.01)
*H04W 4/06*     (2009.01)
(Continued)

(52) U.S. Cl.
CPC .......... *H04L 12/185* (2013.01); *H04L 12/189* (2013.01); *H04L 12/1854* (2013.01);
(Continued)

(58) Field of Classification Search
CPC . H04L 12/185; H04L 12/1854; H04L 12/189; H04L 67/30; H04W 4/70;
(Continued)

(56) References Cited

U.S. PATENT DOCUMENTS 8,687,536 B2    1/2014 Michaelis
2002/0124069 A1    9/2002 Hatalkar
(Continued)

OTHER PUBLICATIONS

International Preliminary Report on Patentability dated Oct. 1, 2019 for International Application No. PCT/US2017/024946.
(Continued)

*Primary Examiner* — Duc C Ho
(74) *Attorney, Agent, or Firm* — 2SPL Patent Attorneys PartG mbB; Yong Beom Hwang

(57) ABSTRACT

A device for participating in a group of cooperating devices that is identified by a group code includes membership circuitry and group circuitry. The membership circuitry is configured to generate and analyze membership messages, wherein the membership messages include a group name that is associated with the group code; and instruct the device to transmit and receive membership messages with a network. The group circuitry is configured to generate and analyze group messages, based at least on a received membership message that includes the group code; and instruct the device to transmit and receive, using a device-to-device interface circuitry of the device, group messages with a device in the group.

14 Claims, 13 Drawing Sheets

(51) Int. Cl.
*H04W 8/00* (2009.01)
*H04W 88/04* (2009.01)

(52) U.S. Cl.
CPC .......... *H04L 67/30* (2013.01); *H04W 4/023* (2013.01); *H04W 4/06* (2013.01); *H04W 4/40* (2018.02); *H04W 4/70* (2018.02); *H04W 8/005* (2013.01); *H04W 76/14* (2018.02); *H04W 76/45* (2018.02); *H04W 88/04* (2013.01)

(58) Field of Classification Search
CPC ....... H04W 76/14; H04W 76/45; H04W 4/40; H04W 4/023; H04W 4/06; H04W 8/005; H04W 88/04
See application file for complete search history.

(56) References Cited

U.S. PATENT DOCUMENTS

| | | | |
|---|---|---|---|
| 2002/0156875 A1* | 10/2002 | Pabla | H04L 41/0893 709/220 |
| 2006/0187897 A1 | 8/2006 | Dabbs, III et al. | |
| 2015/0271860 A1* | 9/2015 | Baghel | H04W 4/08 455/426.1 |
| 2016/0088668 A1* | 3/2016 | Kim | H04W 4/70 370/315 |
| 2016/0198332 A1* | 7/2016 | Chuang | H04W 12/08 455/411 |
| 2016/0269185 A1* | 9/2016 | Stojanovski | H04L 9/0844 |
| 2016/0295347 A1 | 10/2016 | Ahmad et al. | |
| 2016/0344566 A1 | 11/2016 | Pudney | |
| 2017/0048659 A1* | 2/2017 | Silvestri | H04W 4/02 |
| 2018/0063691 A1* | 3/2018 | Shuman | H04W 8/005 |
| 2018/0139670 A1* | 5/2018 | Shaw | H04W 36/0061 |

OTHER PUBLICATIONS

International Search Report dated Dec. 14, 2017 for International Application No. PCT/US2017/024946.
Palepu, Latha P V et al. "Device to Device Communication in LTE." Sasken. Jun. 14, 2016.

* cited by examiner

DEVICE-TO-DEVICE DISCOVERY FOR COOPERATIVE OPERATION

FIELD

The present disclosure relates to the field of wireless communications and in particular to collaborative driving or device cooperative applications that utilize communications related to the Internet of Things (IoT), Vehicle to Everything (V2X), Cellular, Multi-Fire, WiFi, WiGig, sensor networks, mesh networks, and so on.

BACKGROUND

IoT and V2X applications typically involve wireless communications between devices without human intervention. Cooperative driving is one example of an IoT application in which vehicles share their intentions with other nearby vehicles, roadway infrastructure, or even pedestrians. Such information is used by automated driving algorithms to enable accurate prediction of what others will do in the near future, and by doing so optimize their own decisions. In synchronized cooperation, autonomous vehicles exchange messages and synchronize their planned trajectories to optimize driving patterns.

Utilizing a cooperative driving application groups such as convoys or platoons may be formed that operate in a closely linked manner so that the vehicles move like a train with virtual strings attached between vehicles. To maintain distance between vehicles, the vehicles share status information such as speed, heading and intentions such as braking, acceleration, and so on. A vehicle in the group is designated as a "leader" that performs various tasks on behalf of the other vehicles in the group.

BRIEF DESCRIPTION OF THE DRAWINGS

Some examples of circuits, apparatuses and/or methods will be described in the following by way of example only. In this context, reference will be made to the accompanying Figures.

DETAILED DESCRIPTION

Figure 1:
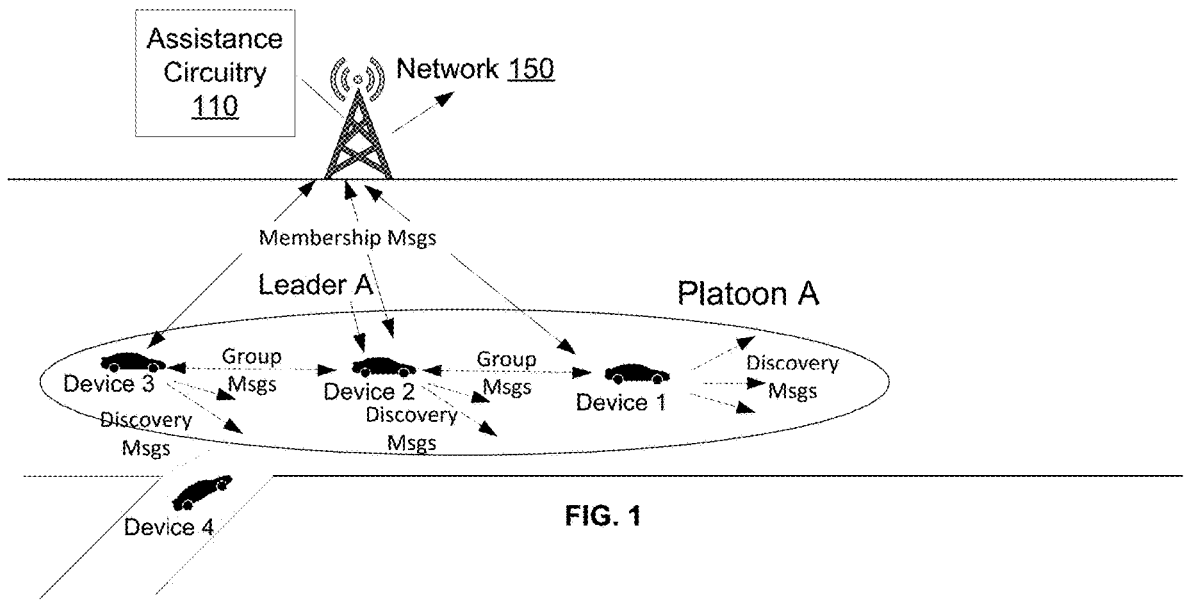
FIG. 1 depicts communication between member devices in a group of vehicles and a network.

During cooperative operation, such as synchronized coordination of driving (e.g., platoon or convoy mode) vehicles form groups with reduced distance among them to improve traffic and fuel efficiency while avoiding collisions. For the purposes of this description, the term "group" or "platoon" will be as a shorthand term for any group of devices that are operating in a cooperative manner such as, for example, belonging to a platoon or convoy, performing synchronized driving, cooperative collision avoidance (CoCA), or other any other type of coordinated or cooperative driving. Further, the term "vehicle" will be used interchangeably with the term "device" as the description will be within the context of cooperative driving or platooning. The term vehicle need not be limited to a passenger carrying vehicle, in some examples, a vehicle is a drone, an IoT device, or any other autonomous device that moves or participates in the transport of some payload. It is to be understood that the group discovery and management techniques described herein may be performed by any type of device (mobile device, communication device, user equipment (UE) device, evolved node B (eNB)/Evolved Universal Terrestrial Radio Access Network (E-UTRAN), and so on) that participates in collaborative or cooperative operation with another device (e.g., even outside the context of driving).

The higher automation and cooperation levels between the vehicles in a platoon rely on data exchanged between the vehicles with low latency and high reliability. Therefore, efficient and reliable group communication functionality among closely proximate devices is important to enable advanced cooperative driving applications in 5G systems. Device-to-device communication, which is the "direct" exchange of messages or data between devices without intervention by an eNB, is an attractive option for providing efficient and reliable group communications between platoon member vehicles for many reasons. For example, device-to-device communication can be performed with reduced latency as compared to communication via an eNB. Device-to-device communication can be performed when connection with an eNB is not possible (e.g., in a tunnel or region without cell coverage), increasing reliability.

Direct communication between devices can be supported by device-to-device communication functionality in long term evolution (LTE) proximity services (ProSe). Device-to-device communication is supported over dedicated resource pools, which are preconfigured or allocated to a group of vehicles by the eNB. Access to data resources within a resource pool (Physical Sidelink Shared Channel (PSSCH)) can be controlled or assigned by the eNB (mode 1) or acquired autonomously by the mobile device (mode 2)

using contention within control resources (Physical Sidelink Control Channel (PSCCH)). From the physical layer (PHY) perspective, device data transmissions are broadcast, i.e., all devices within range are potential receivers. Thus, both unicast and one-to-many communications are possible.

While device-to-device communication has advantages for communication between platoon members, it may also be desirable for a core network or traffic server (hereinafter "the network") to perform some tasks related to platoon management. For example, it may be advantageous for the network to track platoon membership, perform member screening to determine if a vehicle is eligible to join a platoon, communicate traffic information to a platoon leader, and so on. The methods and devices described herein utilize device-to-device communication (on a device-to-device interface) for platoon discovery and formation while allocating other platoon management functions to group operation applications on the device and the eNB. The devices communicate with the network via an eNB, base station, or access point (hereinafter "eNB" is used to designate any network communication access point) depending on the network type to form and manage groups. The network controls group formation by assigning a group code to each active group. The group code is mapped to a group name (in one example, the group name is persistent and may exist even when no groups having that name are active). Membership criteria may be associated with a group name and stored for evaluation by the network. Devices contact the network to determine a group code that is associated with a group the device wishes to join. Devices use the group code to announce to proximate devices that group associated with the group code is in operation.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," "circuitry", and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising."

In the following description, a plurality of details is set forth to provide a more thorough explanation of the embodiments of the present disclosure. However, it will be apparent to one skilled in the art that embodiments of the present disclosure may be practiced without these specific details. In other instances, well-known structures and devices are shown in block diagram form rather than in detail in order to avoid obscuring embodiments of the present disclosure. In addition, features of the different embodiments described hereinafter may be combined with each other, unless specifically noted otherwise.

FIG. 1 illustrates a platooning scenario in which three vehicles (devices 1-3) participate in group A. The vehicles exchange group messages using device-to-device communication to coordinate their actions. The leader of the group (device 2) broadcasts discovery messages, also using the device-to-device interface. In one example, all of the devices in the group broadcast discovery messages. The discovery messages announce or advertise the existence of group A for other vehicles to discover. Device 4 is entering the roadway and may be interested in joining group A. As will be described in more detail below, device 4 may be configured (and possibly authorized by a network 150) to monitor for discovery messages and be able to receive and analyze the discovery message transmitted by device 2.

The formation of groups is controlled by assistance circuitry 110 in the network 150 (e.g., via communication with an evolved node B (ENB)) with which devices exchange membership messages. Membership messages are communicated between devices and the network to enable a device to form, discover, join, and leave a group that is managed by the network. Membership messages are transmitted and received by a device by way of a cellular interface on the device. As will be seen in more detail in FIG. 3, in one example the network 150 includes assistance circuitry 110 which may be a proximity service (ProSe) function in execution on a network that is accessible to the devices by way of cellular communication. To the extent that the description is given in the context of the ProSe function, it is to be understood that any other network function or application may be used to perform the platoon management functions assigned to the network.

After detecting a discovery message that announces group A, device 4 transmits a membership message to the network to determine if the device is allowed to join group A. If device 4 is allowed to join group A, then a membership message from the network to device 4 will be transmitted (to device 4 and/or other devices in the group) that will facilitate the exchange of group messages between device 4 and the devices 1-3 in the group. The use of membership messages for creating and joining groups allows the assistance circuitry 110 to enforce membership criteria that are associated with a given group. For example, a trucking company may set up a platoon service for its trucks with a platooning application on the network 150. A group name or naming convention may be associated with the platoons that will be formed by the company's trucks. Membership criteria can be associated with any group that is formed by the company's trucks. Membership criteria could include allowing only vehicles that are owned by the company to participate in a platoon and/or a maximum number of trucks that may be in a platoon (based on safety considerations). Because the network has ready access to more information than a single device on the road, the network may be able to adjust membership criteria (fewer trucks per platoon in bad weather or heavy traffic, excluding a truck from a platoon that is having mechanical difficulties or has an extremely heavy load, adjusting platoon size based on lane restrictions in a certain region, and so on) as changing conditions warrant.

Another type of membership criterion is based on a subscription concept. A device (for example, a frequent business traveler's company car) may be able to subscribe to the platooning service provided by the platoon application on the network. When the device requests to be able to discover groups and/or join a group, the assistance circuitry 110 determines that the device has subscribed to the platooning service and transmits a membership message with information that enables the device to monitor for discovery messages (e.g., what resources are used for discovery messages) and/or information used to communicate with other devices in the group (e.g. a device identifier for a device in a group, resources to use to communicate, and so on).

Figure 2:
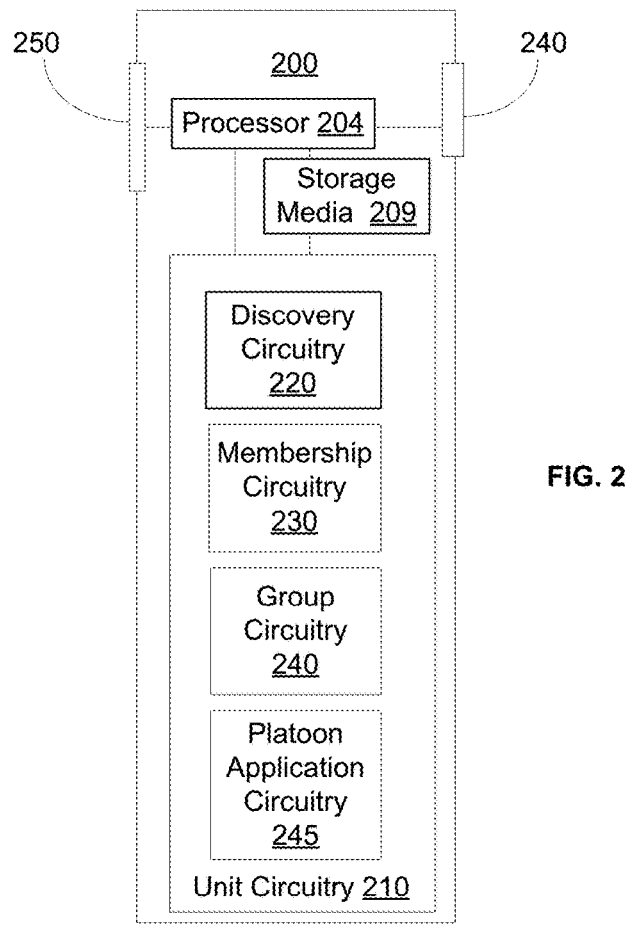
FIG. 2 depicts an exemplary device that is configured to participate in a group.

FIG. 2 illustrates an exemplary architecture for a mobile device 200 that supports coordinated operation amongst a group of devices. The mobile device 200 includes a processor 204, storage media 209, and a unit circuitry 210 that controls the device to perform coordinated operation with other devices in a group. The unit circuitry 210 includes discovery circuitry 220, membership circuitry 230, group circuitry 240, and platoon application circuitry 245. As will be illustrated more fully with reference to the various use cases below, the discovery circuitry 220 is configured to generate and analyze discovery messages, the membership circuitry 230 is configured to generate and analyze membership messages, and the group circuitry 240 is configured to generate and analyze group messages. The platoon application circuitry 245 instructs the device 200 to perform application level tasks like providing a user interface, processing application specific messages, and/or generating events and commands to a user interface or other driving systems.

As used herein, the term "circuitry" may refer to, be part of, or include an Application Specific Integrated Circuit (ASIC), an electronic circuit, a processor (shared, dedicated, or group, e.g., processor 204), and/or memory (shared, dedicated, or group, e.g., storage media 209) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The processor 204 may be configured to cooperate with the storage media 209 and/or the unit circuitry 210 to provide higher-layer operations that include generating and processing signals encoding messages transmitted by the device. The processor 204 may be configured to provide a geographical identifier in the various messages transmitted by the device 200 as described herein. The processor 204 may include one or more single-core or multi-core processors. The processor 204 may include any combination of general-purpose processors and dedicated processors including, for example, digital signal processors (DSPs), central processing units (CPUs), microprocessors, memory controllers (integrated or discrete), etc.

The storage media 209 may be used to load and store data or instructions (collectively "logic") for operations performed by the processor 204. The storage media 209 may include any combination of suitable volatile memory and non-volatile memory. The storage media may include any combination of various levels of memory/storage including, but not limited to, read-only memory (ROM) having embedded software instructions (e.g., firmware), random access memory (e.g., dynamic random access memory (DRAM)), cache, buffers, etc. The storage media 209 may be shared among the various processors or dedicated to particular processors. In some embodiments, one or more of the processors may be combined with one or more storage media and, possibly other circuitry in a single chip, a single chipset, or disposed on a same circuit board in some embodiments.

The device 200 is able to communicate with other devices in device-to-device mode (also called Peer-to-Peer (P2P) mode) over a device-to-device (D2D) interface circuitry 240. Note that the device-to-device interface circuitry 240 may be a dedicated short range communication (DSRC) interface, an enhancement of an existing LTE ProSe PC5 interface, a new ProSe interface defined for 5G systems, a WiFi interface, Bluetooth interface, an interface configured to communicate according to 802.11p, or an interface for any other version of Wireless Personal Area Networks or Wireless Local Area Networks. The mobile device 200 also includes cellular interface circuitry 250 that enables the mobile device to communicate with an eNB or access point/base station. The cellular interface circuitry 250 may be a new fifth generation (5G) interface or it may be an enhancement of existing LTE Uu-interface.

The interface circuitry 240 and 250 may be configured to communicate with other network entities over various interfaces using appropriate networking communication protocols. For example, device-to-device communication by way of the device-to-device interface circuitry 240 may be performed in a designated frequency band, such as 5-6 GHz and in accordance with a selected communication protocol suited for such communication. The cellular interface circuitry 250 may be configured to communicate in a different frequency band using a different communication protocol. Either of the interface circuitry 240 or 250 may be capable of communicating using any number of radio access technologies (RATs). In some embodiments, the interface circuitry 240 or 250 may communicate over Ethernet or other computer networking technologies.

Figure 3:
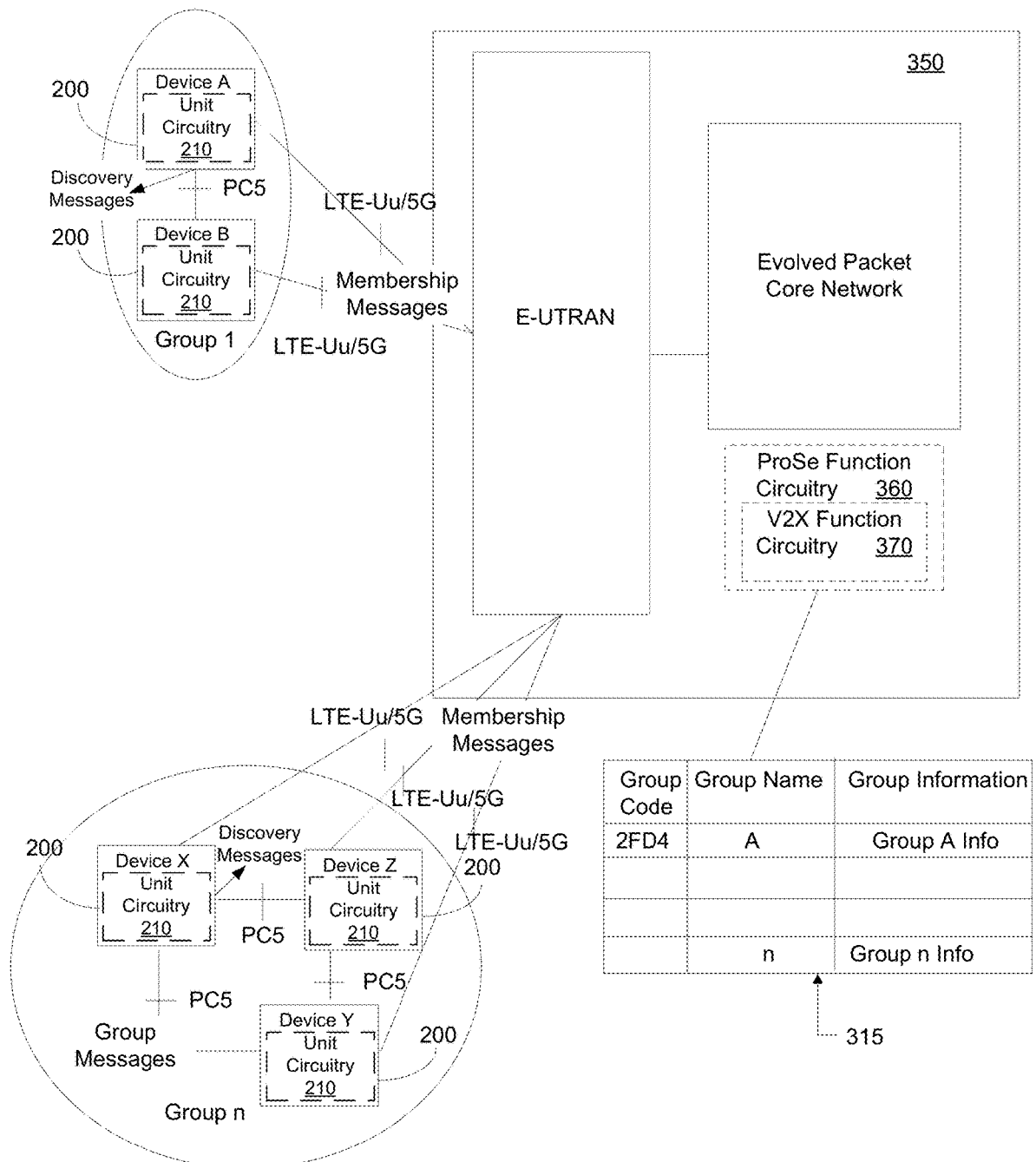
FIG. 3 depicts an exemplary cooperative operation architecture in a proximity services (ProSe) context.

Before describing device-to-device group discovery and network assisted group formation, an overview of devices operating in groups in a ProSe specific environment will be provided. FIG. 3 illustrates an exemplary architecture that supports group mode operation in devices 200 by providing network assistance in the formation and maintenance of device groups. The architecture of FIG. 3 is adapted for use with a ProSe function in both the device (e.g., unit circuitry 210 of FIG. 1) and the network (e.g., assistance circuitry 110 of FIG. 2). The architecture includes a network 350 that wirelessly communicates with a plurality of devices 200. The network 350 includes E-UTRAN equipment, ProSe function circuitry 360, and an evolved packet core (EPC) network. The ProSe function circuitry 360 functions in a manner similar to the group management circuitry 110 of FIG. 1, and is an extension of the ProSe function. In one example, the ProSe function includes a V2X Function 370 circuitry which is an extension of the ProSe function specific to coordinated driving and controls platooning application specific aspects, such as authenticating and authorizing a device for group membership. Unit circuitry 210 is adapted to interact with the ProSe function circuitry 360 to obtain support from the network for setting up group communication. Each device includes PC5 interface circuitry (not shown) that functions in a manner similar to D2D interface 240 of FIG. 2 following the PC5 protocol.

The network 350 (e.g., E-UTRAN or EPC network) allocates resources on a per group basis using group information 315 about devices and groups that is maintained by the ProSe function circuitry 360. The network 350 uses the ProSe Function circuitry 360 to facilitate efficient formation and management of groups throughout the entirety of the covered region. The ProSe function circuitry 360 allows for the forming and managing of groups in the link layer (e.g., by the E-UTRAN) which optimizes resource allocation and access methods leading to reduced latency. For the purposes of this description, the example network and devices will be described in the context of cooperative driving. However, it is to be understood that the device-to-device discovery and network assisted group management techniques described herein are equally applicable to groups of devices that utilize device-to-device communication to cooperate in any way.

Several groups (1-n) of devices 200 are shown. While only two or three devices are shown in each group in FIG. 3, typically several to many devices can be members of the same group. Each device communicates with the E-UTRAN by way of an LTE-Uu interface (in some examples a 5G interface is used instead of the LTE-Uu) and with other devices in a group by way of a PC5 interface. The group circuitry (250 in FIG. 2) which is included in the unit circuitry 210 in each device is configured to generate, transmit, receive, and process group messages with other group member devices according to predetermined rules that apply to a device operating in group mode. Group messages are generated based on responsibilities that are assigned to a device by virtue of the device's membership in a group. A group message is a sidelink or device-to-device communication between group members using the device-to-device interface. Communication of group messages between devices is configured and controlled by the group leader and/or the network 350 (or V2X function 370 within the network).

The devices' actions are controlled to some extent based on group messages received from other group members. Thus it can be said that group messages communicate information between group members that is used by the group members to coordinate actions of the group members. The devices in a group are all configured according to the same group configuration data which is generated based on group information 315 maintained by the ProSe function circuitry 360.

Examples of group messages include sensor data generated by a device's onboard sensors (not shown). The sensor data indicates the device's speed, trajectory, and other information that is useful in coordinating synchronized movement with other group members. Using device-to-device communication of sensor data enables the data to be shared in near real-time, which facilitates the synchronization effort. Event notifications are also communicated in group messages. Event notifications may notify other group members that the device is going to take some action like stopping, steering, and so on. Group messages may also pertain to the device's membership in the group, such as alerting the group members that device is joining the group or that the device is leaving the group and should no longer be involved in synchronization of movement between the devices in the group. Group messages are exchanged between group members as prescribed by configuration data received from the ProSe function circuitry 360. Further examples of group messages were discussed with reference to the use cases below.

To set up for group operation, the device 200 receives group configuration data from the network 350 on the cellular (e.g. LTE-Uu or 5G) interface circuitry 150 and configures various aspects of operation of the device's PC5 interface circuitry 140 in order to communicate group messages within a group to which the device 200 belongs. For example, the device 200 configures the PC5 interface circuitry 140 to utilize a frequency band specified in the configuration data that is assigned to the group. The device may also configure the PC5 interface circuitry to use a particular transmission mode (e.g., scheduled or contention-based) specified by the configuration data that is used by all of the group members. The transmission mode defines the protocol that the device should use in order to access the allocated resources. The transmission mode may be contention-based (the devices listen before transmitting) or scheduled (each device is given a slot).

The ProSe function circuitry 360 causes the network 350 to allocate resources on a group basis. This means that at its creation Group A is allocated a certain set of resources such as a group of resource blocks that will follow Group A. As the membership of Group A changes the resources allocated to Group A remain the same unless the resources are explicitly changed by the network 350. This means that an individual device that is a member of a group and seeks to send a group message to another group member does not need to obtain, from the network 350, the resources to do so. The device may use the resources allocated to all group members throughout its membership in the group. This reduces latency and improves the reliability of the communication between group members.

The ProSe function circuitry 360 controls allocation of resources amongst various groups of devices. The ProSe function circuitry 360 is illustrated as shared between the E-UTRAN and the core network because some of the functions of the ProSe function circuitry 360 may be distributed out to individual eNBs depending on the individual eNB capabilities or desired level of core network control over group management. For example, in one embodiment, the eNB may allocate radio resources using information from the core network and also group information maintained by the ProSe function circuitry 360. In another embodiment, the core network may determine the radio resource allocation for the group.

In general, the ProSe function circuitry 360 (e.g., assistance circuitry 110 of FIG. 1) generates instructions that, when executed by the core network, cause the collection and storage of the group information 315. Group information is information about groups of devices. The ProSe function circuitry 360 generates instructions that, when executed the E-UTRAN RF circuitry, causes the E-UTRAN RF circuitry to i) communicate with the EPC network to obtain the group information for a group that can be used to define the resources to be allocated to the group and ii) transmit the configuration data, including the allocated resources, to the cellular interface circuitry of the devices in a group.

The ProSe function circuitry 360 and/or the assistance circuitry 110 (FIG. 1) controls the formation of and membership in groups. However, it is advantageous to allow devices to discover groups using the D2D interface for the reasons discussed above. To support the use of the "direct" device discovery, a mapping of group code numbers to group names is maintained as part of the group information 315. In one example, the group name may be associated with membership criterion and can exist even when no devices are currently in a group (e.g., when none of a platoon service subscribing company's trucks are in platoon mode). The group code is a code that can be included in a device-to-device discovery message. The group code may be a temporary code that is assigned to a particular group of devices when the group is formed. The group code may be an application code as understood in the ProSe context. Thus, several instances of a group name (with some additional distinguishing characters, suffixes, or prefixes) may be in existence at the same time, but each group instance will have its own unique group code. In another example, wireless local area network (WLAN) direct discovery may be used instead of or in addition to ProSe direct discovery.

Use Cases

FIGS. 4-13 illustrate flows of messages associated with cooperative operation of devices in a group A. In the use case figures, the unit circuitry is illustrated as part of the devices and the assistance circuitry is illustrated as part of the network. In each figure it is to be understood that the messages that are communicated by the devices and the network are generated and analyzed by the unit circuitry and assistance circuitry, respectively. The unit circuitry generates instructions that cause the device to generate, analyze, receive, and transmit the illustrated messages. The assistance circuitry generates instructions that cause a device associated with the network (e.g., eNB) to generate, analyze, receive, and transmit the illustrated messages. When a group message is described as being sent between mobile devices in a group, it is to be understood that the message is encoded in data that is sent and received by way of the device-to-device interface circuitry in the devices. The message may be sent to all devices in the group or to the device that has been assigned as group leader, which may then communicate relevant information from the message to other devices in the group. When a message is described as being sent from the device to the network, it is to be understood that the message is encoded in data that is sent and received by way of the cellular interface circuitry in the device.

Group creation can happen in two different ways, static and dynamic. In both ways, the group is defined by the assistance circuitry associating a specific application name or temporary code (as defined in ProSe) to the group. So a platoon group name is associated with a specific application that will be announced (so the platoon group name can be announced using the ProSe architecture and following ProSe direct discovery).

In a static group the network pre-defines groups and devices are subscribed to be able to join those pre-defined groups. As an example, a trucking company may subscribe for platooning services, and so all vehicles from that trucking company will be subscribed to be able to join that group. The group does not need to be "created", it always exists. When a device gets authorized to use the V2X services, which include a platooning service, the device authorized to participate in that platooning group. If ProSe direct discovery or WLAN direct discovery over ProSe is used to discover a group, then the device simply needs to use that pre-defined group name.

Nested platooning group allows platoon leader to create various sub-groups within master platooning group. It is useful when certain messages are needed to be shared within smaller sub-group instead of entire group and platooning leader can decide based on the characteristics of joining device. This approach has a benefit that the existing leader can create sub-groups without having several leaders for each platoon group.

Figure 4:
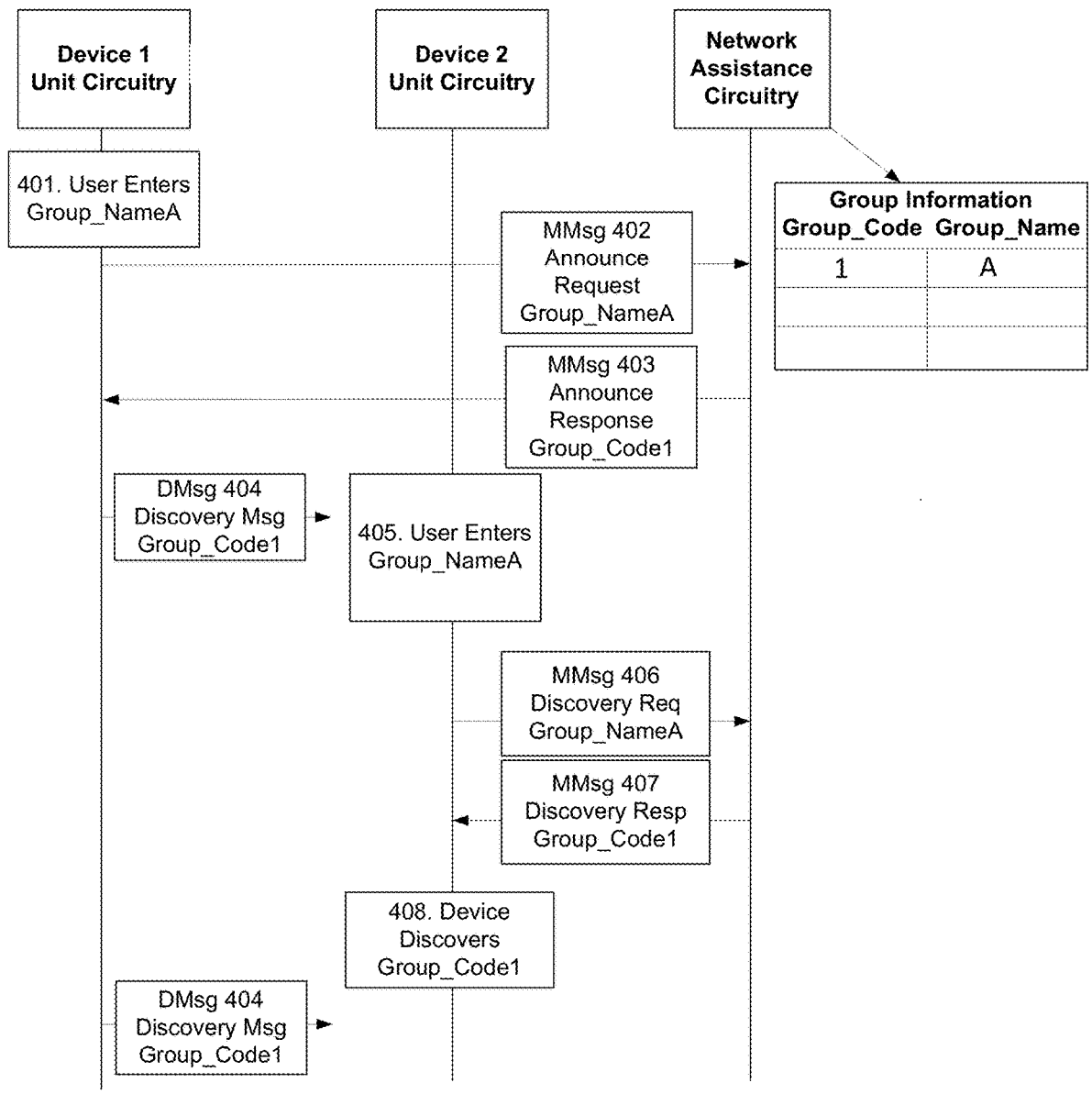
FIG. 4 depicts a first exemplary flow of messages between devices in a group and a network during cooperative operation.

FIG. 4 is an exemplary flow of messages in a ProSe context that illustrate a dynamic group formation, in which a specific user forms a group for platooning. As an example, a group of friends traveling together may want to create a platooning group for the duration of the trip. In order to do that, one of the users triggers group creation. At 401, the user of device 1 selects a group name. The platooning application circuitry 245 in the device may instruct the device 200 to generate an interface for selecting a group name. The name of the group created should be unique to avoid the problem of having two groups choosing the same group name, which would confuse group members. The format of the group name can be as follows: mygroup@abcV2Xservice. As an example, the name of the group could contain the device's temporary ID, or the device could choose a set of random numbers and letters to form the name. The user can also have the ability to choose at least part of the group name, to facilitate identification of the group for other devices that may want to discover that group later on. So the concatenation of a selected name with some random numbers added may be one choice to be used.

The user registers the name of the group (Group A in the figures for simplicity) by membership circuitry in the device 1 generating and transmitting a membership message 402 that includes the group name. In one example, the membership message 402 is an "announce request" message as defined by the ProSe specification. The assistance circuitry determines if the requested group is authorized, and if so assigns a group code (group_code1) to the group name and records the group code in group information for the group name. The assistance generates and transmits a membership message 403 that authorizes the group and includes the group_code1. In one example, the membership message 403 is an "announce response" message as defined by the ProSe specification. Once group A is authorized, discovery circuitry in device 1 begins to periodically broadcast (according to information in the membership message 403) a discovery message 404 that includes group_code1. In one example, the discovery message 404 is a "direct discovery" message sent by way of a PC5 interface as defined by the ProSe specification.

A user of device 2 inputs the group name A in the device's platooning application user interface. (The user may have been given the group name by her friend who created the group using device 1). Membership circuitry in device 2 generates and transmits a membership message 406 that includes the group name A. In one example, the membership message 406 is a "discovery request" message as defined by the ProSe specification. The assistance circuitry evaluates any membership criteria associated with group A and if device 2 may join, the assistance circuitry generates and transmits membership message 407 that includes group_code1. In one example, the membership message 407 is a "discovery response" message as defined by the ProSe specification. In this manner, the discovering device 2 gets the temporary group code that is being used for broadcast discovery messages for group A. The discovery response may include information needed by device to communicate with device 1 (e.g., device 1 identifier).

Figure 5:
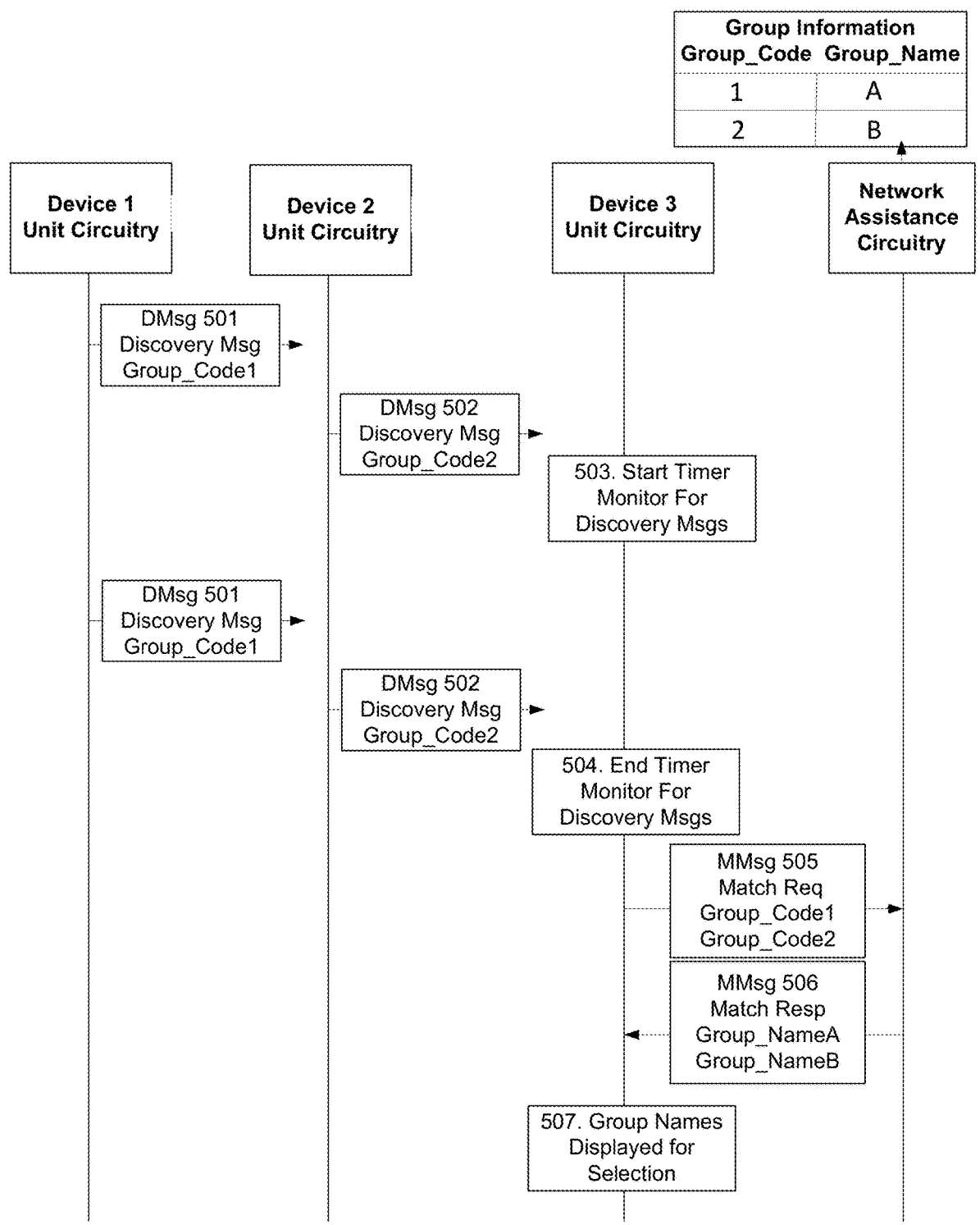
FIG. 5 depicts a second exemplary flow of messages between devices in a group and a network during cooperative operation.

FIG. 5 is an exemplary flow of messages in a ProSe context that illustrate a device using direct device-to-device discovery to discover a group. In the illustrated case the user of device 3 does not have the name of the group the user wants to join. Device 1 and device 2 have both created groups group A and group B, respectively (possibly using the message flow outlined in FIG. 4). Discovery circuitry in device 1 periodically broadcasts a discovery message 501 that includes group_code1. Discovery circuitry in device 2 periodically broadcasts a discovery message 502 that includes group_code2. In one example, the discovery messages 501 and 502 are "direct discovery" messages sent by way of a PC5 interface as defined by the ProSe specification. Recall that discovery messages could be direct signals sent via PC5 air interface or WLAN signals.

At 503, device 3 starts monitoring for discovery messages. In one example, device 3 has been authorized to monitor by the assistance circuitry and has been provided with the information needed to be able to detect discovery messages (e.g., frequency and timeframe of the messages, device masks in use). While device 2 is monitoring, a discovery message 501 and a discovery message 502 are detected by discovery circuitry in device 3. In this manner, by 504 device 3 reads all the temporary group codes that are available in the area (like in ProSe discovery).

Membership circuitry in device 3 then send a membership message 505 to the assistance circuitry listing all temporary codes (e.g., group_code1 and group_code2) found via discovery messages. In one example, the membership message 505 is a "match request" message as defined by the ProSe specification. The assistance circuitry then sends a membership message 506 to device 3 that includes the group name for each of the codes. In one example, the membership message 506 is a "match response" message as defined by the ProSe specification. At 507, the group names are displayed to the user of device 3 in the user interface. The platooning application circuitry 245 in device 3 may instruct the device 200 to generate an interface for selecting a group name. The user of device 3 chooses one of the groups to join and then proceeds to join the group will be outlined in later use cases.

Figure 6:
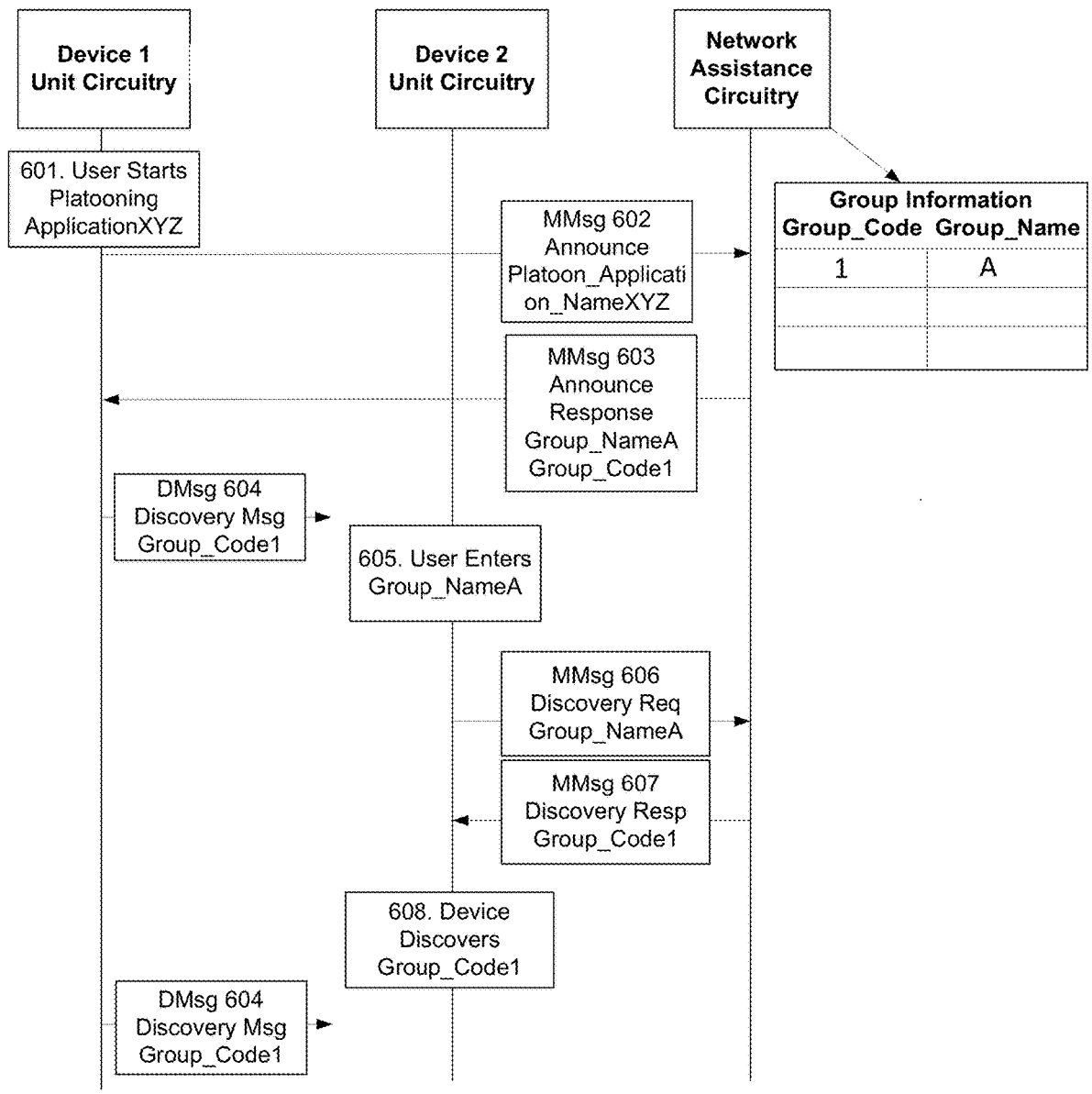
FIG. 6 depicts a third exemplary flow of messages between devices in a group and a network during cooperative operation.

FIG. 6 is an exemplary flow of messages in a ProSe context that illustrate a device using the network to select a name for a group and to form the group. In this option the network will assist the user to choose a name for the group. By way of overview, in this use case, a device will send a request for the network to advertise the application, which in this case will simply be a platooning application (Platoon_Application_NameXYZ). All devices that are authorized to participate in the platoonXYZ may have the same Platoon_Application_Name, so the assistance circuitry selects a group name and a group code for the platoon, and the assistance circuitry makes sure the name is unique for all platoons in a given region. When the device requests an application code to announce the application, the assistance circuitry (e.g., ProSe function) can provide an application code and also the application name. The user can then share the application name with other users interested in the platooning. Then the users can discover that application name using the same procedures described above.

At 601 the user registers opens a platooning application called XYZ on device 1. In response, membership circuitry in the device 1 generates and transmits a membership message 602 that includes the platooning application name. In one example, the membership message 602 is an "announce request" message as defined by the ProSe specification. The assistance circuitry determines if the requested group is authorized, and if so generates a group name and also assigns a group code (group_code1) to the group name and records the group code in group information for the group name. The assistance generates and transmits a membership message 603 that authorizes the group and includes the group_nameA and group_code1. In one example, the membership message 603 is an "announce response" message as defined by the ProSe specification. Once group A is authorized, discovery circuitry in device 1 begins to periodically broadcast (according to information in the membership message 603) a discovery message 604 that includes group_code1. In one example, the discovery message 604 is a "direct discovery" message sent by way of a PC5 interface as defined by the ProSe specification.

A user of device 2 inputs the group name A in the device's platooning application user interface. The user of device 2 may know the name of the group because he has the same platooning application by virtue of working for the same company or as the user of device 1. Membership circuitry in device 2 generates and transmits a membership message 606 that includes the group name A. In one example, the membership message 606 is a "discovery request" message as defined by the ProSe specification. The assistance circuitry evaluates any membership criteria associated with group A and if device 2 may join, the assistance circuitry generates and transmits membership message 607 that includes group_code1. In one example, the membership message 607 is a "discovery response" message as defined by the ProSe specification. In this manner, the discovering device 2 gets the temporary group code that is being used for broadcast discovery messages for group A. The discovery response may include information needed by device to communicate with device 1 (e.g., device 1 identifier).

Figure 7:
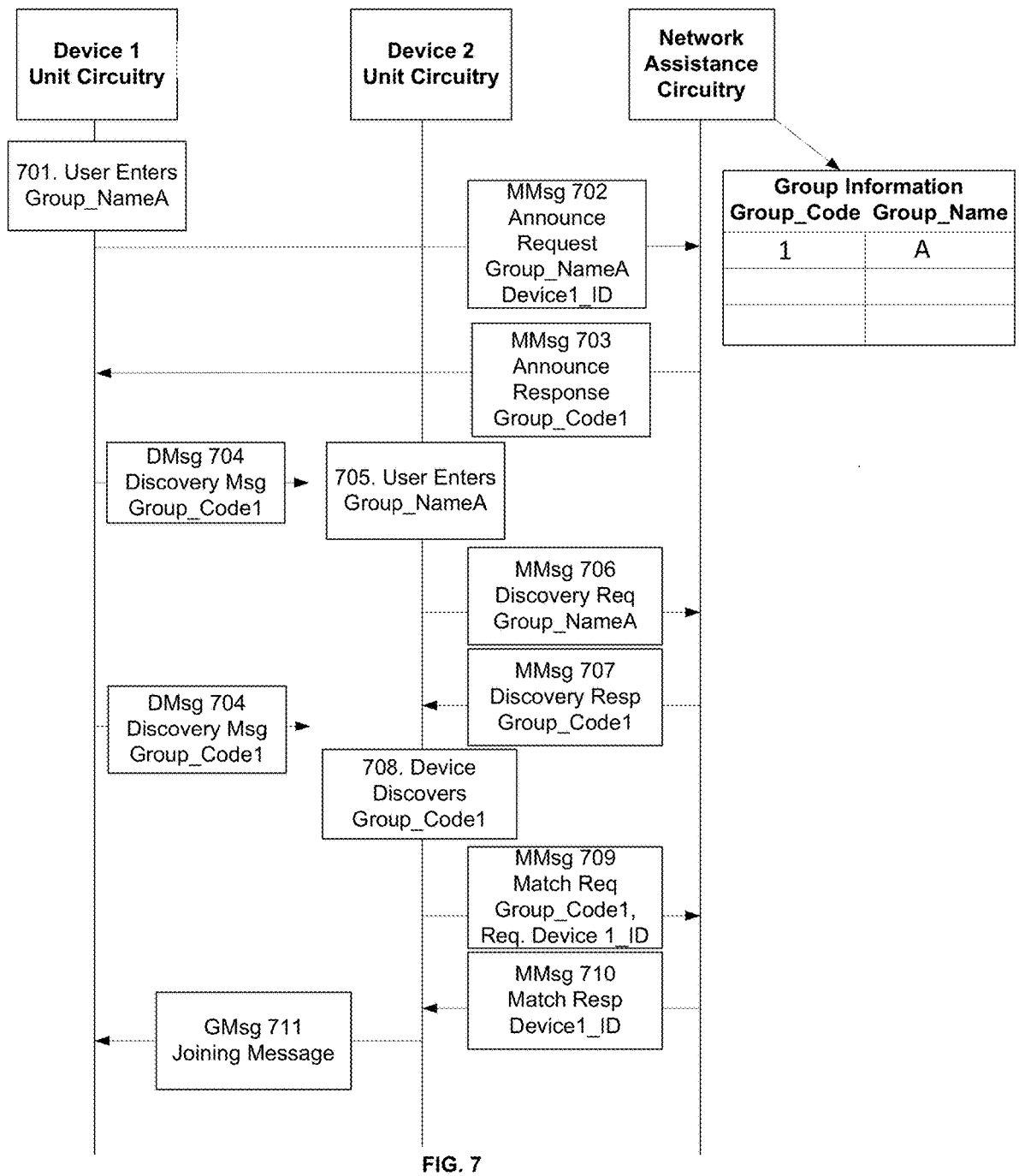
FIG. 7 depicts a fourth exemplary flow of messages between devices in a group and a network during cooperative operation.

FIG. 7 is an exemplary flow of messages in a ProSe context that illustrate device 3 discovering an identity of a group leader device 1 from the assistance circuitry to begin group communication with device 1 and join the group. At 701, the user of device 1 selects a group name. The user of device 1 registers the name of the group (Group A in the figures for simplicity) by membership circuitry in the device 1 generating and transmitting a membership message 702 that includes the group name. The membership message 702 also includes an identifier (e.g., MAC address or IP address) for device 1 that can be used by other devices to directly communicate with device 1. In one example, the membership message 702 is an "announce request" message as defined by the ProSe specification.

The assistance circuitry determines if the requested group is authorized, and if so assigns a group code (group_code1) to the group name and records the group code in group information for the group name. The assistance generates and transmits a membership message 703 that authorizes the group and includes the group_code1. In one example, the membership message 703 is an "announce response" message as defined by the ProSe specification. Once group A is authorized, discovery circuitry in device 1 begins to periodically broadcast (according to information in the membership message 703) a discovery message 704 that includes group_code1. In one example, the discovery message 704 is a "direct discovery" message sent by way of a PC5 interface as defined by the ProSe specification.

A user of device 2 inputs the group name A in the device's platooning application user interface. The platooning application circuitry 245 in the device 2 may instruct the device 200 to generate an interface for inputting a group name. (The user may have been given the group name by her friend who created the group using device 1). Membership circuitry in device 2 generates and transmits a membership message 706 that includes the group name A. In one example, the membership message 706 is a "discovery request" message as defined by the ProSe specification. The assistance circuitry evaluates any membership criteria associated with group A and if device 2 may join, the assistance circuitry generates and transmits membership message 707 that includes group_code1. In one example, the membership message 707 is a "discovery response" message as defined by the ProSe specification. In this manner, the discovering device 2 gets the temporary group code that is being used for broadcast discovery messages for group A.

After detecting the discovery message 704 for group_code1, the membership circuitry in device 2 generates and transmits a membership message 708 that requests the device identifier associated with group_code1. In one example, the membership message 708 is a "match request" message as defined by the ProSe specification. The assistance network reads the group information for the group having group_code1 and generates and transmits a membership message 709 that includes the device identifier for device 1. In one example, the membership message 709 is a "match response" message as defined by the ProSe specification. The group circuitry in device 2 generates and transmits a joining message 711 using the device-to-device interface directly to device 1 based on the device identifier received in membership message 709.

Figure 8:
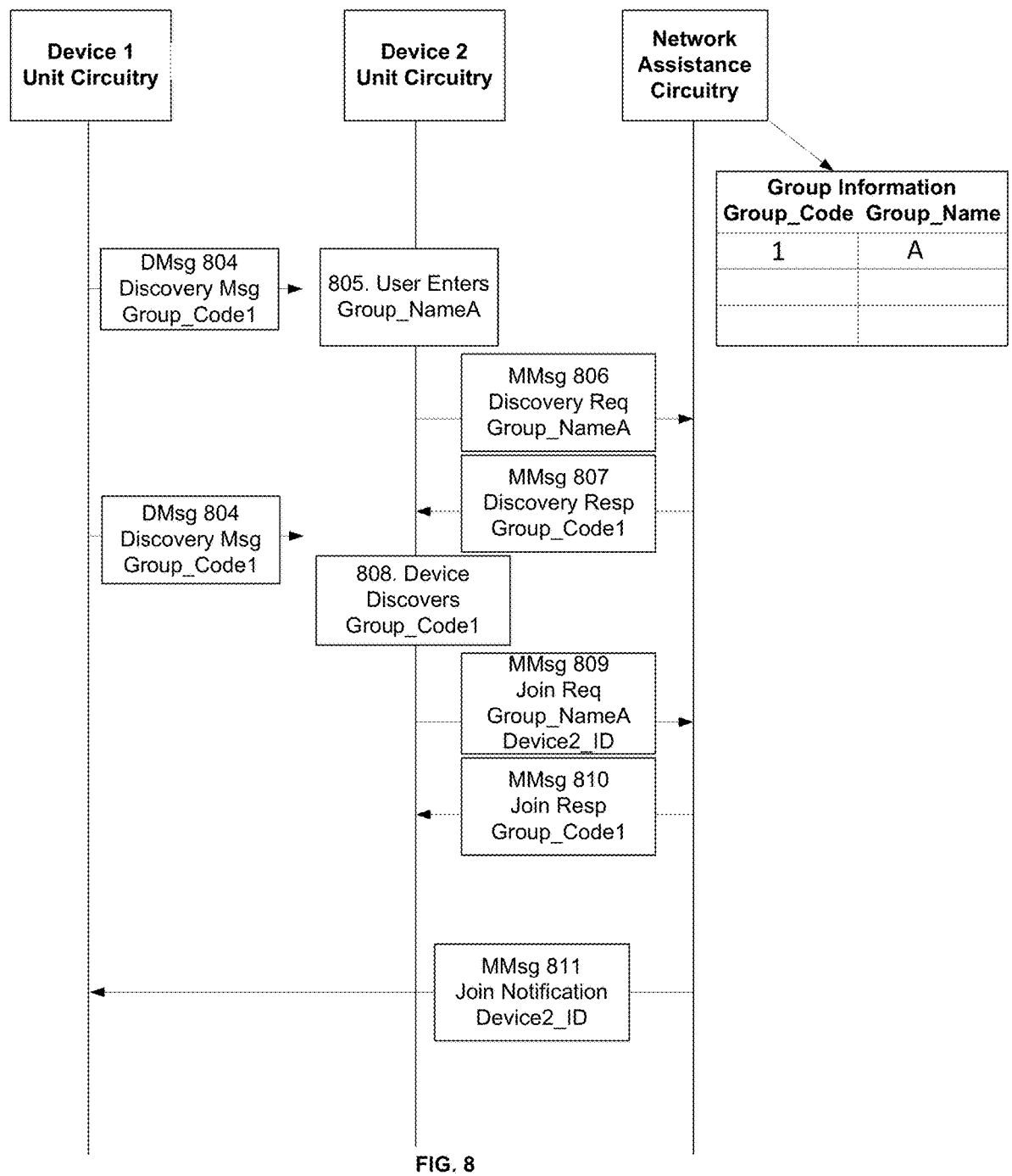
FIG. 8 depicts a fifth exemplary flow of messages between devices in a group and a network during cooperative operation.

FIG. 8 is an exemplary flow of messages in a ProSe context that illustrate device 2 discovering and joining group A, which is led by device 1 and is already in existence as outlined in the previous use cases. Discovery circuitry in device 1 periodically broadcasts a discovery message 804 that includes group_code1. In one example, the discovery message 804 is a "direct discovery" message sent by way of a PC5 interface as defined by the ProSe specification.

A user of device 2 inputs the group name A in the device's platooning application user interface. (The user may have been given the group name by her friend who created the group using device 1). Membership circuitry in device 2 generates and transmits a membership message 806 that includes the group name A. In one example, the membership message 806 is a "discovery request" message as defined by the ProSe specification. The assistance circuitry evaluates any membership criteria associated with group A and if device 2 may join, the assistance circuitry generates and transmits membership message 807 that includes group_code1. In one example, the membership message 807 is a "discovery response" message as defined by the ProSe specification. In this manner, the discovering device 2 gets the temporary group code that is being used for broadcast discovery messages for group A.

After detecting the discovery message 804 for group_code1 and thereby discovering that the platoon identified by group_code1 is reachable by the device 2 at 808, the membership circuitry in device 2 generates and transmits a membership message 809 that requests to join group_nameA. In one example, the membership message 809 is a "join request" message as defined by the ProSe specification. The assistance network reads the group information for the group having group_nameA and, if device 2 meets membership criteria, generates and transmits a membership message 810 that confirms that device 2 may join group_nameA. In one example, the membership message 810 is a "join response" message as defined by the ProSe specification. In this use case, the assistance circuitry generates and transmits a membership message 811 to device 1 that includes a device identifier for device 2.

In one example, the membership message 811 is a "join notification" message as defined by the ProSe specification. Device 1 can now transmit a group message (not shown) directly to device 2.

Figure 9:
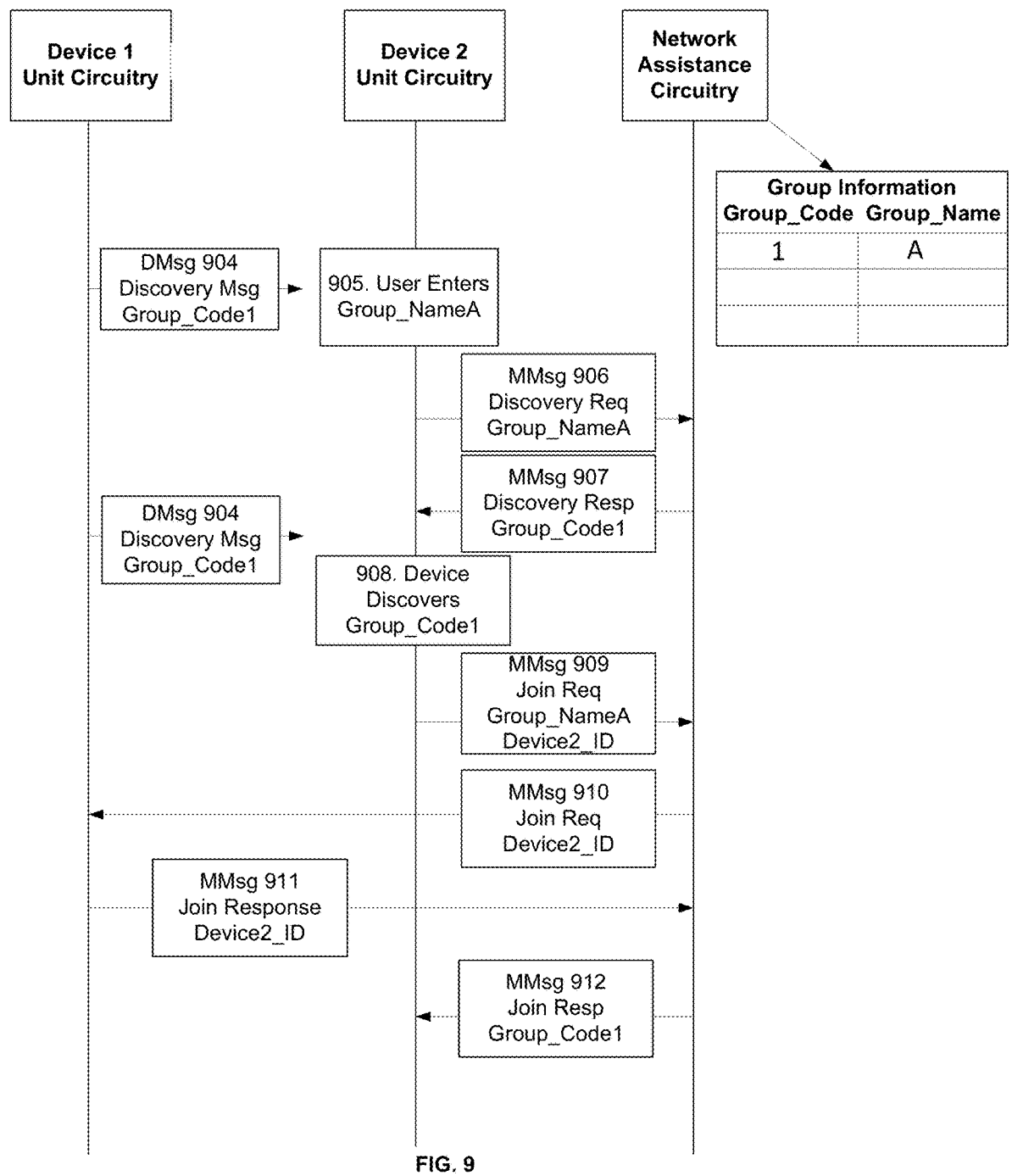
FIG. 9 depicts a sixth exemplary flow of messages between devices in a group and a network during cooperative operation.

FIG. 9 is an exemplary flow of messages in a ProSe context that illustrate device 2 discovering and joining group A, which is led by device 1 and is already in existence as outlined in the previous use cases. Discovery circuitry in device 1 periodically broadcasts a discovery message 904 that includes group_code1. In one example, the discovery message 904 is a "direct discovery" message sent by way of a PC5 interface as defined by the ProSe specification.

A user of device 2 inputs the group name A in the device's platooning application user interface. (The user may have been given the group name by her friend who created the group using device 1). Membership circuitry in device 2 generates and transmits a membership message 906 that includes the group name A. In one example, the membership message 906 is a "discovery request" message as defined by the ProSe specification. The assistance circuitry evaluates any membership criteria associated with group A and if device 2 may join, the assistance circuitry generates and transmits membership message 907 that includes group_code1. In one example, the membership message 907 is a "discovery response" message as defined by the ProSe specification. In this manner, the discovering device 2 gets the temporary group code that is being used for broadcast discovery messages for group A.

After detecting the discovery message 904 for group_code1 and thereby discovering that a platoon identified by group_code1 is reachable by the device 2 at 908, the membership circuitry in device 2 generates and transmits a membership message 909 that requests to join group_nameA. In one example, the membership message 909 is a "join request" message as defined by the ProSe specification. The assistance network reads the group information for the group having group_nameA and, if device 2 meets membership criteria, generates and transmits a membership message 910 to device 1 (which group information indicates is the group leader) that requests that a device having identifier device2_ID may join the group A. In one example, the membership message 910 is a "join request" message as defined by the ProSe specification. In response, membership circuitry in device 1 generates and transmits a membership message that confirms that device 2 may join the group. In one example, the membership message 911 is a "join response" message as defined by the ProSe specification. Device 1 can now transmit a group message (not shown) directly to device 2. The assistance circuitry generates and transmits a membership message 912 to device 2 confirming that device 2 may join the group having group_code1. In one example, the membership message 911 is a "join response" message as defined by the ProSe specification.

Figure 10:
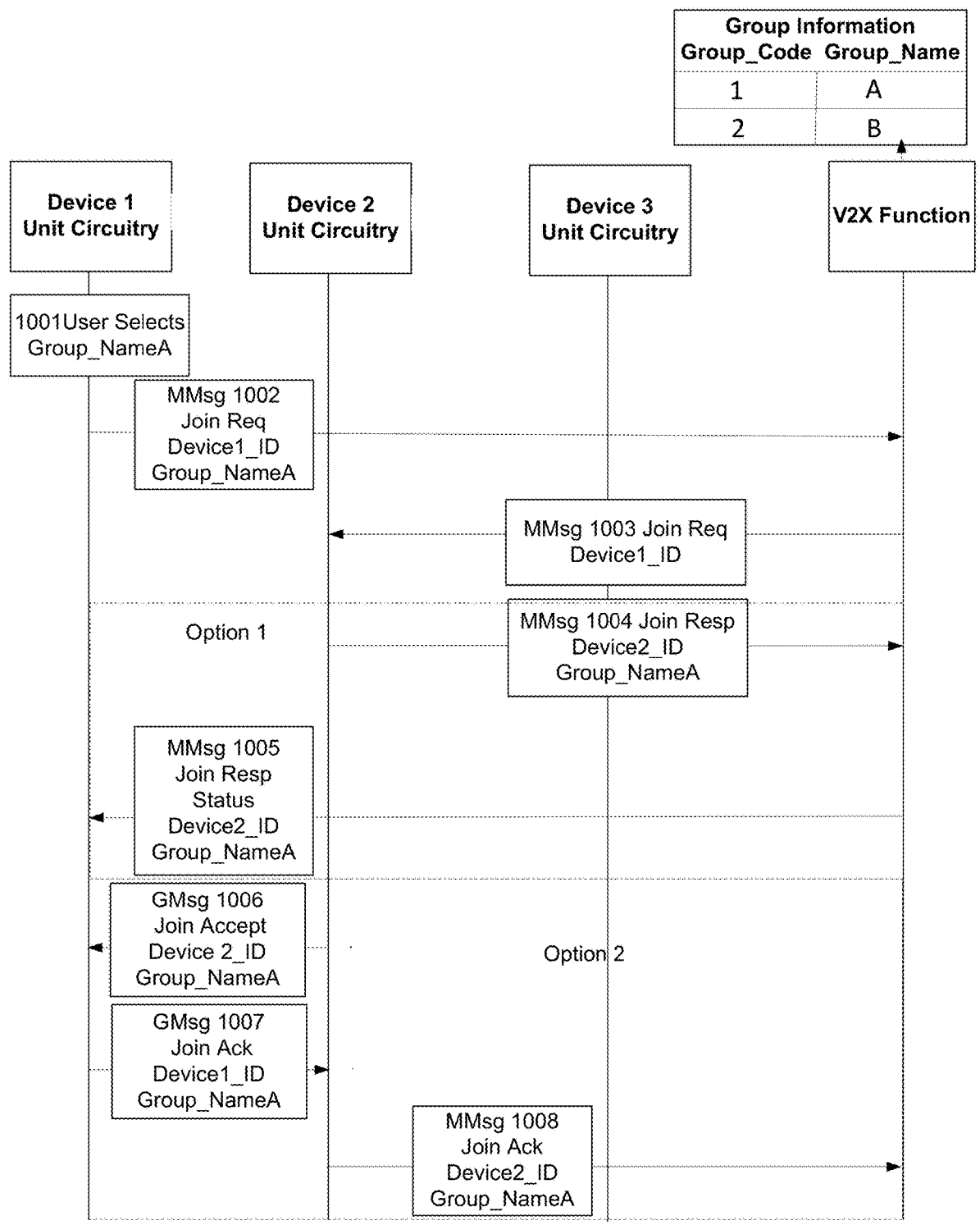
FIG. 10 depicts a seventh exemplary flow of messages between devices in a group and a network during cooperative operation.

FIG. 10 is an exemplary flow of messages in a V2X function (e.g., a special ProSe function for cooperative driving) context that illustrates device 1 joining group A, which is led by device 2 and is already in existence as outlined in the previous use cases. The V2X function is one example of assistance circuitry. The platoon joining process can be done via an application layer communication or network assisted communication. FIG. 10 covers the network assisted platoon join solution.

In the scenario described in FIG. 10, V2X function service subscribers device 2 and device 3 are part of a platoon group A. At 1001, device 1 selects group_nameA as a platoon the device wishes to join. Membership circuitry in device 1 generates and transmits a membership message 1002 that requests that device 1 may join the platoon group A. In one example, the membership message 1002 is a "join request" message as defined by the V2X function specification. The V2X function verifies if device 1 is authorized to participate in platoon A. There can be multiple factors considered such as current platoon size (<optimal platoon size), lane restrictions, and so on by the V2X function. If device 1 is authorized to participate in the platoon A, the V2X function generates and transmits a membership message 1003 to device 2 (the leader of platoon A) that requests that device 1 join platoon A and includes the device identifier for device 1. In one example, the membership message 1003 is a "NewUE_JoinPlatoonRequest" message as defined by the V2X function specification. After this step the sequence of message flow may have options.

In the first option, the group leader of the platoon group A may consider additional current road conditions to assess the feasibility of adding a new member to the platoon. Membership circuitry in device 2 generates and transmits a membership message 1004 to the V2X function that communicates whether it is feasible to add device 1 to the group. In one example, the message 1004 is a "NewUE_JoinPlatoonResponse" message as specified by the V2X function specification. The V2X function in turn generates and transmits a membership message 1005 to the requesting device 1, with the status (SUCCESS, FAILURE, and so on) and the ID of the group leader for platoon A. In one example, the message 1005 is a "Join Response" message as specified by the V2X function specification. Device 1 uses the information in the message 1005 to communicate with device 2 and join the platoon A.

In the second option, in response to the membership message 1003 from the V2X requesting that device 1 join platoon A, group circuitry in device 2 generates and transmits a group message 1006 to device 1 that includes a device identifier for device 2 as well as the name of the platoon. In one example, the message 1006 is a "Join Accept" message as specified by the V2X function specification. In response group circuitry in device 1 generates and transmits a group message 1007 to device 2 to confirm the joining of device 1 to the platoon group A. In one example, the message 1007 is a "Join Acknowledge" message as specified by the V2X function specification. Membership circuitry in device 2, in turn, sends a membership message 1008 to the V2X function to confirm the new member device 1 in the platoon group A. The V2X function may update group information for platoon A based on the entry of device 1 into platoon A.

Figure 11:
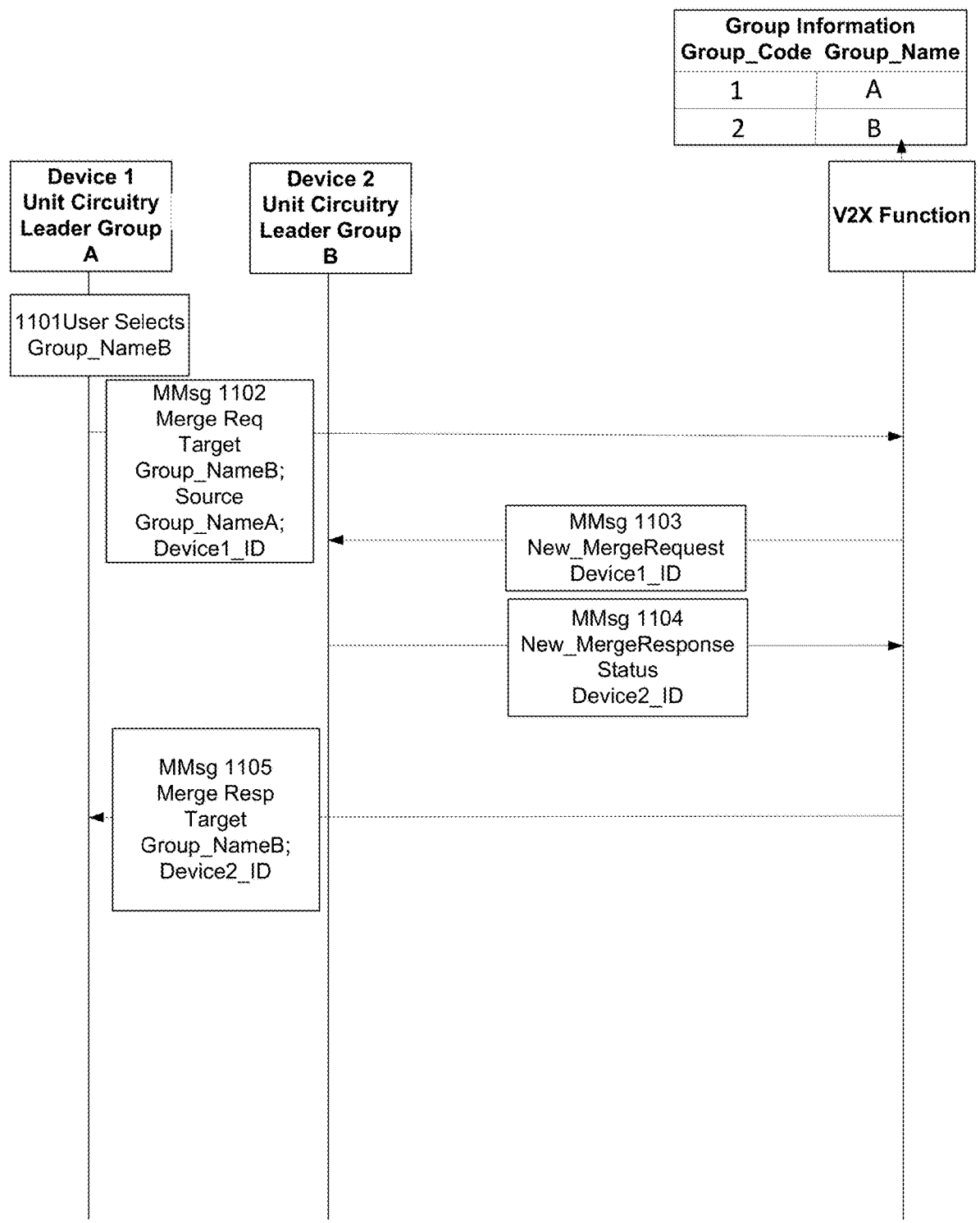
FIG. 11 depicts an eighth exemplary flow of messages between mobile devices in a group and a destination node during coordinated communication.

FIG. 11 is an exemplary flow of messages in a V2X function (e.g., a special ProSe function for cooperative driving) context that illustrates a platoon A led by device 1 merging with platoon B, which is led by device 2. The V2X function is one example of assistance circuitry. At 1001, device 1 selects group_nameB as a platoon the device wishes to merge with. Membership circuitry in device 1 generates and transmits a membership message 1102 that requests that group_name A may join the platoon group_name B and includes a device identifier for device 1. In one example, the membership message 1102 is a "merge request" message as defined by the V2X function specification. The V2X function verifies if platoon A may merge with platoon B. There can be multiple factors considered such as current platoon size (<optimal platoon size), lane restrictions, and so on by the V2X function. If platoon A is authorized to merge with the platoon B, the V2X function generates and transmits a membership message 1103 to device 2 (the leader of platoon B) that requests that platoon A led by device 1 join platoon B and includes the device identifier for device 1. In one example, the membership message 1103 is a "New_MergeRequest" message as defined by the V2X function specification.

The group leader of the platoon group B may consider additional current road conditions to assess the feasibility of merging with platoon A. Membership circuitry in device 2 generates and transmits a membership message 1104 to the V2X function that communicates, by way of a status field, whether it is feasible to merge platoon A with platoon B and also includes a device identifier for device 2. In one example, the message 1104 is a "New_MergeResponse" message as specified by the V2X function specification. The V2X function in turn generates and transmits a membership message 1105 to the requesting device 1, with the status (SUCCESS, FAILURE, and so on) and the ID of the group leader for platoon A. In one example, the message 1105 is a "Merge Response" message as specified by the V2X function specification. The device 1 announces to all platoon A members about platoon B and identifies the leader as device 2. Device 1 and the other devices in platoon A join the platoon B.

Figure 12:
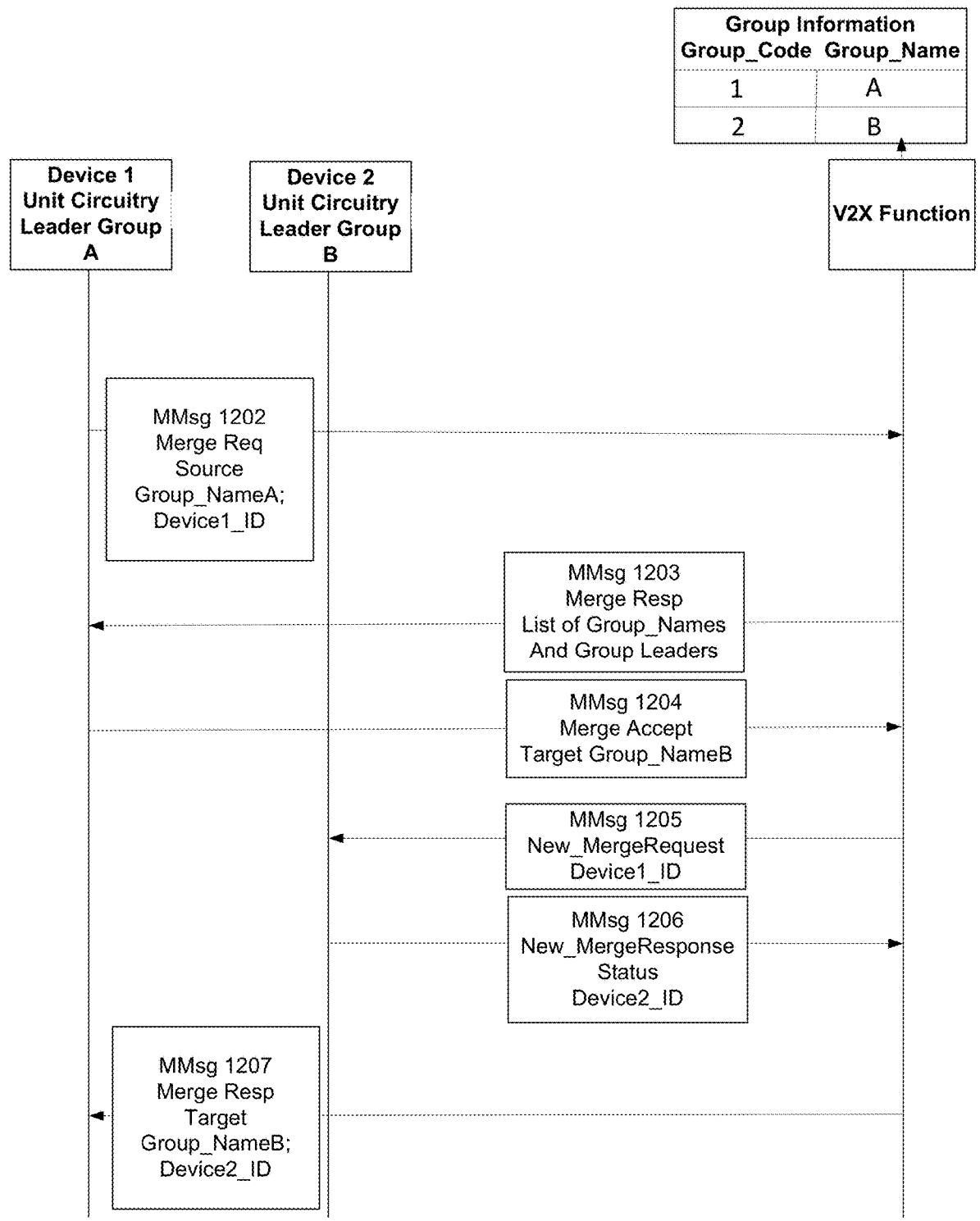
FIG. 12 depicts a ninth exemplary flow of messages between mobile devices in a group and a destination node during coordinated communication.

FIG. 12 is an exemplary flow of messages in a V2X function (e.g., a special ProSe function for cooperative driving) context that illustrates device 1, which is the leader of platoon A using the V2X function to find a platoon to merge with. The V2X function is one example of assistance circuitry. Membership circuitry in device 1 generates and transmits a membership message 1202 that requests for the V2X function to identify any platoons that platoon A may merge with. In response, the V2X function reads the group information and populates a list of platoons (group leader identifier, group_name) in the vicinity of platoon A. The V2X function considers any membership criteria for platoons while populating the list. The V2X function generates and transmits a membership message 1203 that that includes the list. In one example, the membership message 1203 is a "merge response" message as defined by the V2X function specification. The user of device 1 selects platoon B for merging. Membership circuitry in device 1 generates and transmits a membership message 1204 accepting merger with platoon B and confirming the leader of platoon B as device 2. In one example, the membership message 1204 is a "merge accept" message as defined by the V2X function specification. In response, the V2X function generates and transmits a membership message 1205 to device 2 (the leader of platoon B) that requests that platoon A led by device 1 join platoon B and includes the device identifier for device 1. In one example, the membership message 1103 is a "New_MergeRequest" message as defined by the V2X function specification. The group leader of the platoon group B may consider additional current road conditions to assess the feasibility of merging with platoon A. Membership circuitry in device 2 generates and transmits a membership message 1206 to the V2X function that communicates, by way of a status field, whether it is feasible to merge platoon A with platoon B and also includes a device identifier for device 2. In one example, the message 1206 is a "New_MergeResponse" message as specified by the V2X function specification. The V2X function in turn generates and transmits a membership message 1207 to the requesting device 1 confirming platoon A's merger with platoon B. In one example, the message 1207 is a "Merge Response" message as specified by the V2X function specification. The device 1 announces to all platoon A members about platoon B and identifies the leader as device 2. Device 1 and the other devices in platoon A join the platoon B.

Figure 13:
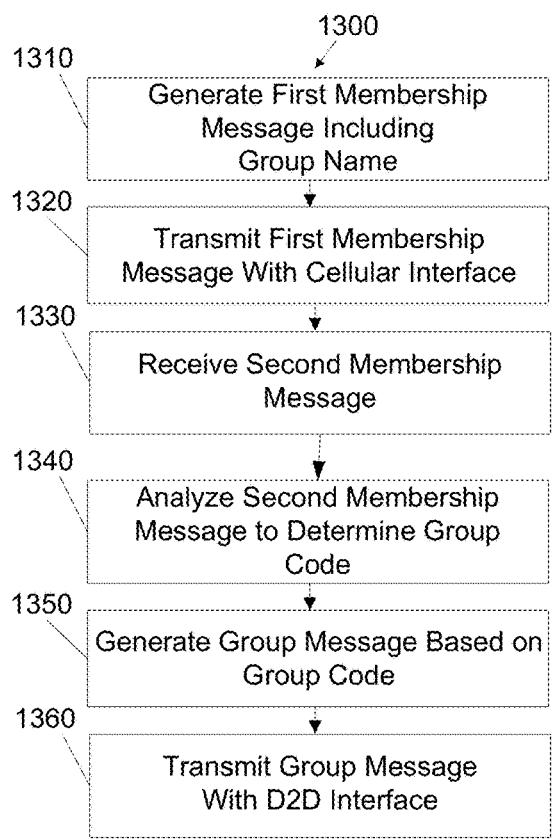
FIG. 13 depicts an exemplary method of participating in coordinated operation with other devices.

FIG. 13 illustrates a flow diagram depicting an exemplary method 1300 for performing cooperative operation amongst a group of devices. The method 1300 may be performed by the unit circuitry 210 of FIG. 2. The method includes, at 1310, generating a first membership message comprising a group name. At 1320 the first membership message is transmitted using cellular interface circuitry of the device. The method includes, at 1330, receiving a second membership message using the cellular interface circuitry; and at 1340, analyzing the second membership message to determine the group code. At 1350 a group message is generated based at least on the group code. At 1360, the group message is transmitted to a device in the group using a device-to-device interface circuitry of the device.

Figure 14:
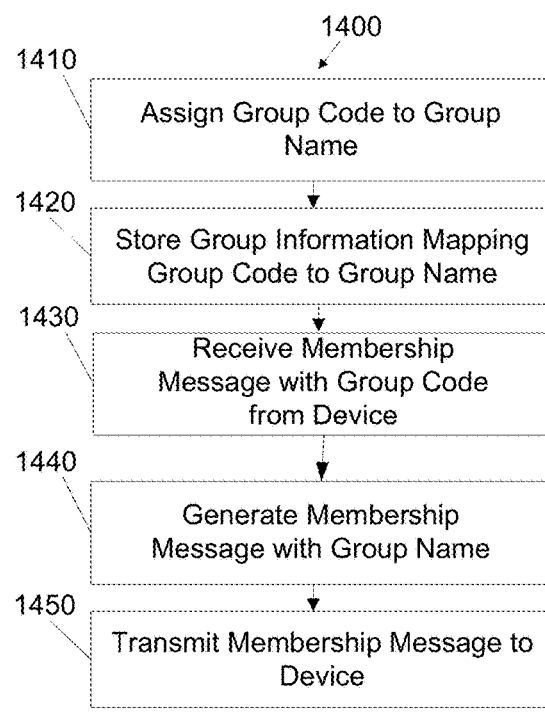
FIG. 14 depicts an exemplary method of assisting a device to participate in coordinated operation with other devices.

FIG. 14 illustrates a flow diagram depicting an exemplary method 1400 for assisting a device to participate in cooperative operation amongst a group of devices. The method 1400 may be performed by the assistance circuitry 110 of FIG. 1. The method includes, at 1410, assigning a unique group code to a unique group name and, at 1420, storing group information including, for each group, the group code mapped to the group name. At 1430, a membership message including a group code is received. At 1440, the method includes generating a responsive membership message including a group name mapped to the group code. At 1450 the responsive membership message is transmitted to the device.

It can be seen from the foregoing description that the direct device-to-device group discovery and network assisted group formation described herein increase effectiveness of cooperative operation by reducing latency in discovery and inter-group communication while leveraging network knowledge in the creation of groups.

Example Device

Figure 15:
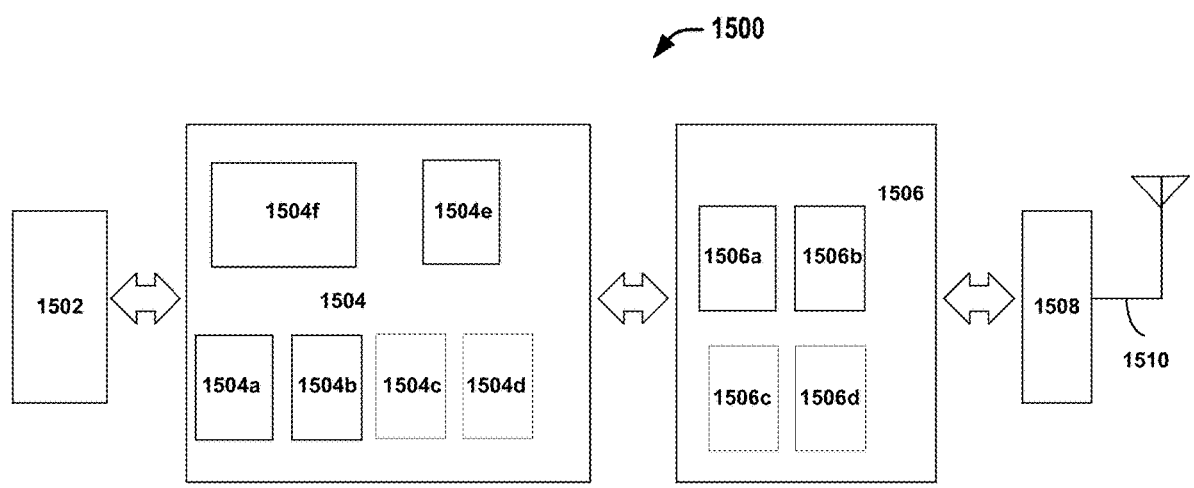
FIG. 15 illustrates example components of a device, according to one embodiment of the disclosure.

Embodiments described herein may be implemented into a system using any suitably configured hardware and/or software. FIG. 15 illustrates, for one embodiment, example components of a device 1500. The device 1500 may be utilized as a User Equipment (UE) device or an evolved node B (eNB) device or E-UTRAN equipment. In some embodiments, the device 1500 may include application circuitry 1502, baseband circuitry 1504, Radio Frequency (RF) circuitry 1506, front-end module (FEM) circuitry 1508 and one or more antennas 1510, coupled together at least as shown.

The application circuitry 1502 may include one or more application processors. For example, the application circuitry 1502 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications, such as a VMIMO application as described and/or operating systems to run on the system.

The baseband circuitry 1504 may include circuitry such as, but not limited to, one or more single-core or multi-core processors. The baseband circuitry 1504 may include one or more baseband processors and/or control logic to process baseband signals received from a receive signal path of the RF circuitry 1506 and to generate baseband signals for a transmit signal path of the RF circuitry 1506. Baseband processing circuitry 1504 may interface with the application circuitry 1502 for generation and processing of the baseband signals and for controlling operations of the RF circuitry 1506. For example, in some embodiments, the baseband circuitry 1504 may include a second generation (2G) baseband processor 1504a, third generation (3G) baseband processor 1504b, fourth generation (4G) baseband processor 1504c, and/or other baseband processor(s) 1504d for other existing generations, generations in development or to be developed in the future (e.g., fifth generation (5G), 6G, etc.). The baseband circuitry 1504 (e.g., one or more of baseband processors 1504a-d) may handle various radio control functions that enable communication with one or more radio networks via the RF circuitry 1506. The radio control functions may include, but are not limited to, signal modulation/demodulation, encoding/decoding, radio frequency shifting, etc. In some embodiments, modulation/demodulation circuitry of the baseband circuitry 1504 may include Fast-Fourier Transform (FFT), precoding, and/or constellation mapping/demapping functionality. In some embodiments, encoding/decoding circuitry of the baseband circuitry 1504 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1504 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 1504e of the baseband circuitry 1504 may be configured to run elements of the protocol stack for signaling of the PHY, MAC, RLC, PDCP and/or RRC layers. In some embodiments, the baseband circuitry may include one or more audio digital signal processor(s) (DSP) 1504f. The audio DSP(s) 1504f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1504 and the application circuitry 1502 may be implemented together such as, for example, on a system on a chip (SOC).

In some embodiments, the baseband circuitry 1504 may provide for communication compatible with one or more radio technologies. For example, in some embodiments, the baseband circuitry 1504 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 1504 is configured to support radio communications of more than one wireless protocol may be referred to as multi-mode baseband circuitry.

RF circuitry 1506 may enable communication with wireless networks using modulated electromagnetic radiation through a non-solid medium. In various embodiments, the RF circuitry 1506 may include switches, filters, amplifiers, etc. to facilitate the communication with the wireless network. RF circuitry 1506 may include a receive signal path which may include circuitry to down-convert RF signals received from the FEM circuitry 1508 and provide baseband signals to the baseband circuitry 1504. RF circuitry 1506 may also include a transmit signal path which may include circuitry to up-convert baseband signals provided by the baseband circuitry 1504 and provide RF output signals to the FEM circuitry 1508 for transmission.

In some embodiments, the RF circuitry 1506 may include a receive signal path and a transmit signal path. The receive signal path of the RF circuitry 1506 may include mixer circuitry 1506a, amplifier circuitry 1506b and filter circuitry 1506c. The transmit signal path of the RF circuitry 1506 may include filter circuitry 1506c and mixer circuitry 1506a. RF circuitry 1506 may also include synthesizer circuitry 1506d for synthesizing a frequency for use by the mixer circuitry 1506a of the receive signal path and the transmit signal path. In some embodiments, the mixer circuitry 1506a of the receive signal path may be configured to down-convert RF signals received from the FEM circuitry 1508 based on the synthesized frequency provided by synthesizer circuitry 1506d. The amplifier circuitry 1506b may be configured to amplify the down-converted signals and the filter circuitry 1506c may be a low-pass filter (LPF) or band-pass filter (BPF) configured to remove unwanted signals from the down-converted signals to generate output baseband signals. Output baseband signals may be provided to the baseband circuitry 1504 for further processing. In some embodiments, the output baseband signals may be zero-frequency baseband signals, although this is not a requirement. In some embodiments, mixer circuitry 1506a of the receive signal path may comprise passive mixers, although the scope of the embodiments is not limited in this respect.

In some embodiments, the mixer circuitry 1506a of the transmit signal path may be configured to up-convert input baseband signals based on the synthesized frequency provided by the synthesizer circuitry 1506d to generate RF output signals for the FEM circuitry 1508. The baseband signals may be provided by the baseband circuitry 1504 and may be filtered by filter circuitry 1506c. The filter circuitry 1506c may include a low-pass filter (LPF), although the scope of the embodiments is not limited in this respect.

In some embodiments, the mixer circuitry 1506a of the receive signal path and the mixer circuitry 1506a of the transmit signal path may include two or more mixers and may be arranged for quadrature downconversion and/or upconversion respectively. In some embodiments, the mixer circuitry 1506a of the receive signal path and the mixer circuitry 1506a of the transmit signal path may include two or more mixers and may be arranged for image rejection (e.g., Hartley image rejection). In some embodiments, the mixer circuitry 1506a of the receive signal path and the mixer circuitry 1506a may be arranged for direct downconversion and/or direct upconversion, respectively. In some embodiments, the mixer circuitry 1506a of the receive signal path and the mixer circuitry 1506a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1506 may include analog-to-digital converter (ADC) and digital-to-analog converter (DAC) circuitry and the baseband circuitry 1504 may include a digital baseband interface to communicate with the RF circuitry 1506.

In some dual-mode embodiments, a separate radio IC circuitry may be provided for processing signals for each spectrum, although the scope of the embodiments is not limited in this respect.

In some embodiments, the synthesizer circuitry 1506d may be a fractional-N synthesizer or a fractional N/N+1 synthesizer, although the scope of the embodiments is not limited in this respect as other types of frequency synthesizers may be suitable. For example, synthesizer circuitry 1506d may be a delta-sigma synthesizer, a frequency multiplier, or a synthesizer comprising a phase-locked loop with a frequency divider.

The synthesizer circuitry 1506d may be configured to synthesize an output frequency for use by the mixer circuitry 1506a of the RF circuitry 1506 based on a frequency input and a divider control input. In some embodiments, the synthesizer circuitry 1506d may be a fractional N/N+1 synthesizer.

In some embodiments, frequency input may be provided by a voltage controlled oscillator (VCO), although that is not a requirement. Divider control input may be provided by either the baseband circuitry 1504 or the applications processor 1502 depending on the desired output frequency. In some embodiments, a divider control input (e.g., N) may be determined from a look-up table based on a channel indicated by the applications processor 1502.

Synthesizer circuitry 1506d of the RF circuitry 1506 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1506d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1506 may include an IQ/polar converter.

FEM circuitry 1508 may include a receive signal path which may include circuitry configured to operate on RF signals received from one or more antennas 1510, amplify the received signals and provide the amplified versions of the received signals to the RF circuitry 1506 for further processing. FEM circuitry 1508 may also include a transmit signal path which may include circuitry configured to amplify signals for transmission provided by the RF circuitry 1506 for transmission by one or more of the one or more antennas 1510. When used in a mobile device, FEM circuitry 1508 may also include a transmit and receive path for device-to-device communications received directly from another mobile device, without traveling through the E-UTRAN (e.g. device-to-device interface circuitry). When used in a mobile device, FEM circuitry 1508 may also include a transmit and receive path for cellular communications received from the eNB or E-UTRAN (e.g. cellular interface circuitry).

In some embodiments, the FEM circuitry 1508 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 1506). The transmit signal path of the FEM circuitry 1508 may include a power amplifier (PA) to amplify input RF signals (e.g., provided by RF circuitry 1506), and one or more filters to generate RF signals for subsequent transmission (e.g., by one or more of the one or more antennas 1510.

In some embodiments, the device 1500 may include additional elements such as, for example, memory/storage, display, camera, sensor, and/or input/output (I/O) interface.

While the systems, circuitry and methods have been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure.

Examples can include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

Example 1 is a device for participating in a group of cooperating devices that is identified by a group code including membership circuitry and group circuitry. The membership circuitry is configured to generate and analyze membership messages, wherein the membership messages include a group name that is associated with the group code; and instruct the device to transmit and receive membership messages with a network. The group circuitry is configured to generate and analyze group messages, based at least on a received membership message that includes the group code; and instruct the device to transmit and receive, using a device-to-device interface circuitry of the device, group messages with a device in the group.

Example 2 includes the subject matter of example 1, including or omitting any optional elements, including discovery circuitry configured to generate and analyze discovery messages, wherein the discovery messages include the group code; and instruct the device to transmit and receive the discovery messages using the device-to-device interface circuitry of the device.

Example 3 includes the subject matter of example 2, including or omitting any optional elements, wherein the discovery circuitry is configured to generate and analyze discovery messages in accordance with a proximity services (ProSe) specification for direct discovery messages; the membership circuitry is configured to generate and analyze membership messages in accordance with a proximity services (ProSe) specification for membership messages; and the group circuitry is configured to generate and analyze group messages in accordance with a proximity services (ProSe) specification for group messages.

Example 4 includes the subject matter of examples 1-3, including or omitting any optional elements, wherein the membership messages include: a discovery request message transmitted by the device including a request for a group name that is associated with a group code; and a discovery response message analyzed by the device including the group name associated with the group code.

Example 5 includes the subject matter of examples 1-3, including or omitting any optional elements, wherein the membership messages include an announce request message transmitted by the device including a group name and a request for a group code that is assigned to the group name; and an announce response message analyzed by the device including the group code assigned to the group code.

Example 6 includes the subject matter of examples 1-3, including or omitting any optional elements, wherein the membership messages include a match request message transmitted by the device including a group code and a request for a device identifier for the leader device of the group identified by the group code; and a match response message analyzed by the device including the a device identifier.

Example 7 includes the subject matter of examples 1-3, including or omitting any optional elements, wherein the membership messages include a join request message transmitted by the device including the group name and a request to join the group of the devices; and a join response message analyzed by the device including a notification that the device is a member of the group of devices.

Example 8 includes the subject matter of examples 1-3, including or omitting any optional elements, wherein the device-to-device interface circuitry includes a PC5 interface.

Example 9 includes the subject matter of examples 1-3, including or omitting any optional elements, wherein the cellular interface circuitry includes an LTE-Uu interface or a 5G interface.

Example 10 is a device for assisting other devices to operate cooperatively in a group of devices, including assistance circuitry. The assistance circuitry is configured to: assign a unique group code to a unique group name; store group information including, for each group, the group code mapped to the group name; and in response to receiving, from a second device, a first membership message including a group code: generate a first responsive membership message including a group name mapped to the group code; and transmit the first responsive membership message to the second device; and in response to receiving, from the third device, a second membership message including a group name: generate a second responsive membership message including a group code mapped to the group name; and transmit the second responsive membership message to the third device.

Example 11 includes the subject matter of example 10, including or omitting any optional elements, wherein the group information includes, for each group, a membership criterion, wherein the assistance circuitry is configured to: in response to receiving, from a second device, a membership message including a group name, evaluate the membership criterion for the group associated with the group name; and when the membership criterion is met, coordinate device-to-device communication between the second device and a leader device of the group.

Example 12 includes the subject matter of example 10, including or omitting any optional elements, wherein the group code is a temporary code.

Example 13 includes the subject matter of example 10, including or omitting any optional elements, wherein the assistance circuitry is configured to generate and analyze membership messages in accordance with a proximity services (ProSe) function specification.

Example 14 is computer-readable medium having computer-executable instructions stored thereon for causing a device to participate in a group of devices, the instructions including instructions that, when executed by a processor of the device, cause the processor to: generate a first membership message including a group name; instruct the device to transmit the first membership message using cellular interface circuitry of the device; instruct the device to receive a second membership message using the cellular interface circuitry; analyze the second membership message to determine the group code; generate a group message based at least on the group code; and instruct the device to transmit the group message to a device in the group using a device-to-device interface circuitry of the device.

Example 15 includes the subject matter of example 14, including or omitting any optional elements, wherein the instructions include instructions, that when executed by the processor, cause the processor to: generate and analyze discovery messages, wherein the discovery messages include the group code; and instruct the device to transmit and receive the discovery messages using the device-to-device interface circuitry of the device.

Example 16 includes the subject matter of example 15, including or omitting any optional elements, wherein the instructions include instructions, that when executed by the processor, cause the processor to: generate and analyze discovery messages in accordance with a proximity services (ProSe) specification for direct discovery messages; generate and analyze membership messages in accordance with a proximity services (ProSe) specification for membership messages; and generate and analyze group messages in accordance with a proximity services (ProSe) specification for group messages.

Example 17 includes the subject matter of examples 14-16, including or omitting any optional elements, wherein the membership messages include: a discovery request message transmitted by the device including a request for a group name that is associated with a group code; and a discovery response message analyzed by the device including the group name associated with the group code.

Example 18 includes the subject matter of examples 14-16, including or omitting any optional elements, wherein the membership messages include: an announce request message transmitted by the device including a group name and a request for a group code that is assigned to the group name; and an announce response message analyzed by the device including the group code assigned to the group code.

Example 17 includes the subject matter of examples 14-16, including or omitting any optional elements, wherein the membership messages include: a match request message transmitted by the device including a group code and a request for a device identifier for the leader device of the group identified by the group code; and a match response message analyzed by the device including the a device identifier.

Example 17 includes the subject matter of examples 14-16, including or omitting any optional elements, wherein the membership messages include: a join request message transmitted by the device including the group name and a request to join the group of the devices; and a join response message analyzed by the device including a notification that the device is a member of the group of devices.

Example 21 is computer-readable medium having computer-executable instructions stored thereon for assisting a device to participate in a group of devices, the instructions including instructions that, when executed by a processor of an access point to a network, cause the processor to: assign a unique group code to a unique group name; store group information including, for each group, the group code mapped to the group name; receive a membership message including a group code generate a responsive membership message including a group name mapped to the group code; and instruct the access point to transmit the responsive membership message to the device.

Example 22 includes the subject matter of example 21, including or omitting any optional elements, wherein the group information includes, for each group, a membership criterion, and wherein the instructions include instructions, that when executed by the processor, cause the processor to: in response to receiving, from a second device, a membership message including a group name, evaluate the membership criterion for the group associated with the group name; and when the membership criterion is met, coordinate device-to-device communication between the second device and a device in the group.

Example 23 includes the subject matter of example 21, including or omitting any optional elements, wherein the group code is a temporary code.

Example 24 includes the subject matter of example 21, including or omitting any optional elements, wherein the instructions include instructions, that when executed by the processor, cause the processor to generate and analyze membership messages in accordance with a proximity services (ProSe) function specification.

Example 25 is a method for causing a device to participate in a group of devices, including: generating a first membership message including a group name; instructing the device to transmit the first membership message using cellular interface circuitry of the device; instructing the device to receive a second membership message using the cellular interface circuitry; analyzing the second membership message to determine the group code; generating a group message based at least on the group code; and instructing the device to transmit the group message to a device in the group using a device-to-device interface circuitry of the device.

Example 26 includes the subject matter of example 25, including or omitting any optional elements, including: generating and analyze discovery messages, wherein the discovery messages include the group code; and instructing the device to transmit and receive the discovery messages using the device-to-device interface circuitry of the device.

Example 27 includes the subject matter of example 27, including or omitting any optional elements, including generating and analyze discovery messages in accordance with a proximity services (ProSe) specification for direct discovery messages; generating and analyze membership messages in accordance with a proximity services (ProSe) specification for membership messages; and generating and analyze group messages in accordance with a proximity services (ProSe) specification for group messages.

Example 28 includes the subject matter of examples 25-27, wherein the membership messages include: a discovery request message transmitted by the device including a request for a group name that is associated with a group code; and a discovery response message analyzed by the device including the group name associated with the group code.

Example 29 includes the subject matter of examples 25-27, wherein the membership messages include: an announce request message transmitted by the device including a group name and a request for a group code that is assigned to the group name; and an announce response message analyzed by the device including the group code assigned to the group code.

Example 30 includes the subject matter of examples 25-27, wherein the membership messages include: a match request message transmitted by the device including a group code and a request for a device identifier for the leader device of the group identified by the group code; and a match response message analyzed by the device including the a device identifier.

Example 31 is a computer-readable storage device storing computer-executable instructions that, in response to execution, cause a processor to perform the method of any of claims 25-30.

Example 32 is a method, including: assigning a unique group code to a unique group name; storing group information including, for each group, the group code mapped to the group name; receiving a membership message including a group code; generating a responsive membership message including a group name mapped to the group code; and instructing the access point to transmit the responsive membership message to the device.

Example 33 includes the subject matter of example 32, wherein the group information includes, for each group, a membership criterion, and wherein the method includes: in response to receiving, from a second device, a membership message including a group name, evaluating the membership criterion for the group associated with the group name; and when the membership criterion is met, coordinating device-to-device communication between the second device and a device in the group.

Example 34 includes the subject matter of example 32, wherein the group code is a temporary code.

Example 35 includes the subject matter of example 32, wherein the membership messages include: generating and analyzing membership messages in accordance with a proximity services (ProSe) function specification.

Example 36 is a computer-readable storage device storing computer-executable instructions that, in response to execution, cause a processor to perform the method of any of claims 32-35.

The foregoing description of one or more implementations provides illustration and description, but is not intended to be exhaustive or to limit the scope of the example embodiments to the precise form disclosed. Modifications and variations are possible in light of the above teachings or may be acquired from practice of various implementations of the example embodiments.

The invention claimed is:

1. A device for participating in a group of cooperating devices that is identified by a group code, comprising:
   membership circuitry configured to:
      generate and analyze membership messages, wherein the membership messages comprise a group name that is associated with the group code; and
      instruct the device to transmit and receive, using a cellular interface circuitry of the device, membership messages with a network;
   group circuitry configured to:
      generate and analyze group messages, based at least on a received membership message that includes the group code; and
      instruct the device to transmit and receive, using a device-to-device interface circuitry of the device, group messages with a device in the group,
   wherein the membership messages comprise:
   an announce request message transmitted by the device comprising a group name and a request for a group code that is assigned to the group name, and an announce response message analyzed by the device comprising the group code assigned to the group code, and/or
   a match request message transmitted by the device comprising a group code and a request for a device identifier for the leader device of the group identified by the group code, and a match response message analyzed by the device comprising the device identifier, and/or
   a join request message transmitted by the device comprising the group name and a request to join the group of the devices, and a join response message analyzed by the device comprising a notification that the device is a member of the group of devices.

2. The device of claim 1, comprising discovery circuitry configured to:
   generate and analyze discovery messages, wherein the discovery messages comprise the group code; and
   instruct the device to transmit and receive the discovery messages using the device-to- device interface circuitry of the device.

3. The device of claim 2, wherein:
   the discovery circuitry is configured to generate and analyze discovery messages in accordance with a proximity services (ProSe) specification for direct discovery messages;
   the membership circuitry is configured to generate and analyze membership messages in accordance with a proximity services (ProSe) specification for membership messages; and
   the group circuitry is configured to generate and analyze group messages in accordance with a proximity services (ProSe) specification for group messages.

4. The device of claim 1, wherein the membership messages comprise:
   a discovery request message transmitted by the device comprising a request for a group name that is associated with a group code; and
   a discovery response message analyzed by the device comprising the group name associated with the group code.

5. The device of claim 1, wherein the device-to-device interface circuitry comprises a PC5 interface.

6. The device of claim 1, wherein the cellular interface circuitry comprises an LTE-Uu interface or a 5G interface.

7. A device for assisting other devices to operate cooperatively in a group of devices, comprising:
assistance circuitry configured to:
assign a unique group code to a unique group name;
store group information comprising, for each group, the group code mapped to the group name; and
in response to receiving, from a second device, a first membership message comprising a group code:
generate a first responsive membership message comprising a group name mapped to the group code; and
transmit the first responsive membership message to the second device; and
in response to receiving, from the third device, a second membership message comprising a group name:
generate a second responsive membership message comprising a group code mapped to the group name; and
transmit the second responsive membership message to the third device,
wherein the group information comprises, for each group, a membership criterion, wherein the assistance circuitry is configured to:
in response to receiving, from a second device, a membership message comprising a group name, evaluate the membership criterion for the group associated with the group name; and
when the membership criterion is met, coordinate device-to-device communication between the second device and a leader device of the group.

8. A non-transitory computer-readable medium having computer-executable instructions stored thereon for causing a device to participate in a group of devices, the instructions comprising instructions that, when executed by a processor of the device, cause the processor to:
generate a first membership message comprising a group name;
instruct the device to transmit the first membership message using cellular interface circuitry of the device;
instruct the device to receive a second membership message using the cellular interface circuitry;
analyze the second membership message to determine thea group code;
generate a group message based at least on the group code; and
instruct the device to transmit the group message to a device in the group using a device-to-device interface circuitry of the device,
wherein the membership messages comprise:
an announce request message transmitted by the device comprising a group name and a request for a group code that is assigned to the group name, and an announce response message analyzed by the device comprising the group code assigned to the group code, and/or
a match request message transmitted by the device comprising a group code and a request for a device identifier for the leader device of the group identified by the group code, and a match response message analyzed by the device comprising the device identifier, and/or
a join request message transmitted by the device comprising the group name and a request to join the group of the devices, and a join response message analyzed by the device comprising a notification that the device is a member of the group of devices.

9. The non-transitory computer-readable medium of claim 8, wherein the instructions comprise instructions, that when executed by the processor, cause the processor to:
generate and analyze discovery messages, wherein the discovery messages comprise the group code; and
instruct the device to transmit and receive the discovery messages using the device-to-device interface circuitry of the device.

10. The non-transitory computer-readable medium of claim 9, wherein the instructions comprise instructions, that when executed by the processor, cause the processor to:
generate and analyze discovery messages in accordance with a proximity services (ProSe) specification for direct discovery messages;
generate and analyze membership messages in accordance with a proximity services (ProSe) specification for membership messages; and
generate and analyze group messages in accordance with a proximity services (ProSe) specification for group messages.

11. The non-transitory computer-readable medium of claim 8, wherein the membership messages comprise:
a discovery request message transmitted by the device comprising a request for a group name that is associated with a group code; and
a discovery response message analyzed by the device comprising the group name associated with the group code.

12. A non-transitory computer-readable Computer readable medium having computer-executable instructions stored thereon for assisting a device to participate in a group of devices, the instructions comprising instructions that, when executed by a processor of an access point to a network, cause the processor to:
assign a unique group code to a unique group name;
store group information including, for each group, the group code mapped to the group name;
receive a membership message comprising a group code;
generate a responsive membership message including a group name mapped to the group code; and
instruct the access point to transmit the responsive membership message to the device,
wherein the group information comprises, for each group, a membership criterion, and wherein the instructions comprise instructions, that when executed by the processor, cause the processor to:
in response to receiving, from a second device, a membership message comprising a group name, evaluate the membership criterion for the group associated with the group name; and
when the membership criterion is met, coordinate device-to-device communication between the second device and a device in the group.

13. The non-transitory computer-readable medium of claim 12, wherein the group code is a temporary code.

14. The non-transitory computer-readable medium of claim 12, wherein the instructions comprise instructions, that when executed by the processor, cause the processor to generate and analyze membership messages in accordance with a proximity services (ProSe) function specification.

* * * * *